United States Patent
Berquam et al.

(10) Patent No.: US 11,327,629 B2
(45) Date of Patent: *May 10, 2022

(54) SYSTEMS AND METHODS FOR AUGMENTED REALITY WITH PRECISE TRACKING

(71) Applicant: Rypplzz, Inc., Hermosa Beach, CA (US)

(72) Inventors: Brandon Phillip Berquam, South Pasadena, CA (US); Ciara Rayne Staggs, Oak View, CA (US); Joshua James Pendrick, Hermosa Beach, CA (US); Andrew Tsui Jung, Los Angeles, CA (US)

(73) Assignee: Rypplzz, Inc., Manhattan Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/158,425

(22) Filed: Jan. 26, 2021

(65) Prior Publication Data

US 2021/0286501 A1  Sep. 16, 2021

Related U.S. Application Data

(63) Continuation of application No. 16/775,692, filed on Jan. 29, 2020, now Pat. No. 10,908,771.

(Continued)

(51) Int. Cl.
*G06F 3/04815* (2022.01)
*G06T 19/00* (2011.01)
(Continued)

(52) U.S. Cl.
CPC .......... *G06F 3/04815* (2013.01); *G06F 3/011* (2013.01); *G06F 3/04845* (2013.01); *G06T 19/006* (2013.01); *G06T 2200/24* (2013.01)

(58) Field of Classification Search
CPC .. G06F 3/04815; G06F 3/04845; G06F 3/011; G06T 19/006; G06T 2200/24
See application file for complete search history.

(56) References Cited

U.S. PATENT DOCUMENTS 5,317,140 A    5/1994 Dunthorn
7,466,262 B2  12/2008 Stephans
(Continued)

FOREIGN PATENT DOCUMENTS

KR    10-1918262 B1    11/2018

OTHER PUBLICATIONS

PCT Search Report and Written Opinion, dated May 27, 2020, regarding PCT/US2020/015708, 12 pages.
VERSES; https://www.verses.io/, printed on Jul. 1, 2019.

*Primary Examiner* — Samantha (Yuehan) Wang
(74) *Attorney, Agent, or Firm* — Knobbe, Martens, Olson & Bear LLP

(57) ABSTRACT

Systems and methods are described that enable augmented reality, virtual reality, and/or other content to be associated with precise geo-spatial locations in a physical environment. A model of a physical environment is accessed and a three dimensional mesh definition comprising a plurality of mesh cells is received where the mesh is associated with the physical environment. A given mesh cell is associated with a logical address. Augmented reality, virtual reality, and/or other content may be associated with a given mesh cell. Tracking data corresponding to movement of a user in the physical environment is received. The tracking data may be compared with mesh cell locations to identify matching mesh cells. Addresses associated with the matching mesh cells are used to identify associated content. The identified associated augmented reality, virtual reality, and/or other (Continued)

content may be rendered using an augmented reality, virtual reality, or other rendering device.

32 Claims, 28 Drawing Sheets

Related U.S. Application Data

(60) Provisional application No. 62/799,614, filed on Jan. 31, 2019.

(51) Int. Cl.
  *G06F 3/04845* (2022.01)
  *G06F 3/01* (2006.01)

(56) References Cited

U.S. PATENT DOCUMENTS

| | | | |
|---|---|---|---|
| 9,060,346 | B1 | 6/2015 | Shcheglov |
| 10,908,771 | B2 * | 2/2021 | Berquam ............... G06F 3/011 |
| 2002/0131643 | A1 | 9/2002 | Fels et al. |
| 2004/0006424 | A1 | 1/2004 | Joyce et al. |
| 2004/0171388 | A1 | 9/2004 | Couronne et al. |
| 2006/0139750 | A1 | 6/2006 | Solomon |
| 2007/0152157 | A1 | 7/2007 | Page |
| 2009/0259432 | A1 | 10/2009 | Liberty et al. |
| 2013/0116044 | A1 | 5/2013 | Schwartz |
| 2013/0210491 | A1 | 8/2013 | Eriksson et al. |
| 2013/0217333 | A1 | 8/2013 | Sprigg et al. |
| 2014/0074361 | A1 | 3/2014 | O'Connor et al. |
| 2014/0171122 | A1 | 6/2014 | Ortiz et al. |
| 2016/0026253 | A1 | 1/2016 | Bradski et al. |
| 2016/0224103 | A1 | 8/2016 | Kochi |
| 2016/0247324 | A1 | 8/2016 | Mullins et al. |
| 2017/0287205 | A1 | 10/2017 | Makinen et al. |
| 2018/0114364 | A1 * | 4/2018 | McPhee ................. G06F 3/038 |
| 2018/0204365 | A1 * | 7/2018 | Lee .......................... B60R 1/00 |
| 2018/0350144 | A1 * | 12/2018 | Rathod .............. G06Q 20/3276 |
| 2019/0108682 | A1 * | 4/2019 | Spivack ............. G06Q 30/0273 |
| 2019/0272673 | A1 * | 9/2019 | Mathur .................... G06T 15/20 |
| 2019/0318168 | A1 * | 10/2019 | Meier ................ G06K 9/00671 |
| 2020/0021668 | A1 | 1/2020 | Lyons |
| 2020/0027256 | A1 | 1/2020 | Simpkinson |
| 2020/0027257 | A1 | 1/2020 | Arana |

* cited by examiner

SYSTEMS AND METHODS FOR AUGMENTED REALITY WITH PRECISE TRACKING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Field of the Invention

The present disclosure relates to systems and methods configured to provide augmented reality and/or virtual reality experiences, and more particularly to systems and methods that utilize precise user tracking in multiple dimensions to provide enhanced reality and/or virtual reality experiences.

Description of the Related Art

Augmented reality (AR) systems have been developed that conventionally provide a live view of a physical, real-world environment, augmented by computer-generated sensory input such as images (e.g., video, still images, graphics, etc.), text, and sound.

However, conventional AR systems fail to provide precise tracking of user movement, limbs, hands, and fingers in large public environments, such as stadiums and malls. Further, conventional AR systems often only provide relatively simple user interaction with the augmented sensory data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a computer system configured to provide augmented reality experiences, the computer system comprising: one or more processing devices; a network interface; non-transitory memory that stores instructions that when executed by the one or more processing devices are configured to cause the computer system to perform operations comprising: accessing a model of a first physical environment; receiving a mesh definition of a three dimensional mesh using the network interface from a first terminal via a user interface, the three dimensional mesh comprising a plurality of mesh cells, wherein a given mesh cell is associated with a logical address; associating the mesh definition of the three dimensional mesh with the model of the first physical environment, wherein a given mesh cell corresponds to a specific location in the first physical environment; enabling content and an action to be associated with a given mesh cell; receiving, in real time, tracking data corresponding to movement of a first user in the first physical environment; comparing the tracking data of the first user with mesh cell locations; based at least on the comparison of the tracking data of the first user with mesh cell locations, identifying one or more matching mesh cells; using logical addresses associated with the one or more matching mesh cells, identifying associated content, actions, and/or rules; using the identified associated content, actions, and/or rules associated with the one or more matching mesh cells, causing augmented reality content to be rendered by a device in proximity to the first user, the augmented reality content displayed in association with a view of a physical space.

An aspect of the present disclosure relates to a computer implemented method, the method comprising: accessing, using a computer system comprising one or more computing devices, a representation of a first physical environment; enabling a user interface to be rendered via a terminal, the user interface enabling a user to associate an item of content to a location in the first physical environment; receiving, via the user interface, an association of an item of content with a first location in the first physical environment, wherein the first location is associated with coordinates comprising three dimensions and the item of content comprises visual, audio, textual, and/or computer executable code; receiving using the computer system, in real time, tracking data corresponding to movement of a first entity in the first physical environment; based at least in part on the tracking data, determining using the computer system that the first entity is viewing or in proximity with the first location in the first physical environment; at least partly in response to determining that the first entity is viewing or in proximity with the first location in the first physical environment, enabling the content associated with the first location to be rendered by a device or to be executed.

An aspect of the present disclosure relates to a non-transitory computer readable storage medium storing computer-executable instructions that, when executed, are configured to cause a computer system comprising one or more processing devices to perform operations, comprising: receiving, via an interface enabling an association of an item of content to a location in a first physical environment, an association of an item of content with a first location in the first physical environment, wherein the first location is associated with coordinates comprising three dimensions and the item of content comprises visual, audio, textual, and/or computer executable code; receiving, in real time, tracking data corresponding to movement and/or presence of a first entity in the first physical environment; based at least in part on the tracking data, determining using that the first entity is viewing or in proximity with the first location in the first physical environment; and at least partly in response to determining that the first entity is viewing or in proximity with the first location in the first physical environment, enabling the content associated with the first location to be rendered by a device or the content to be executed.

BRIEF DESCRIPTION OF THE DRAWINGS

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

Figure 1A:
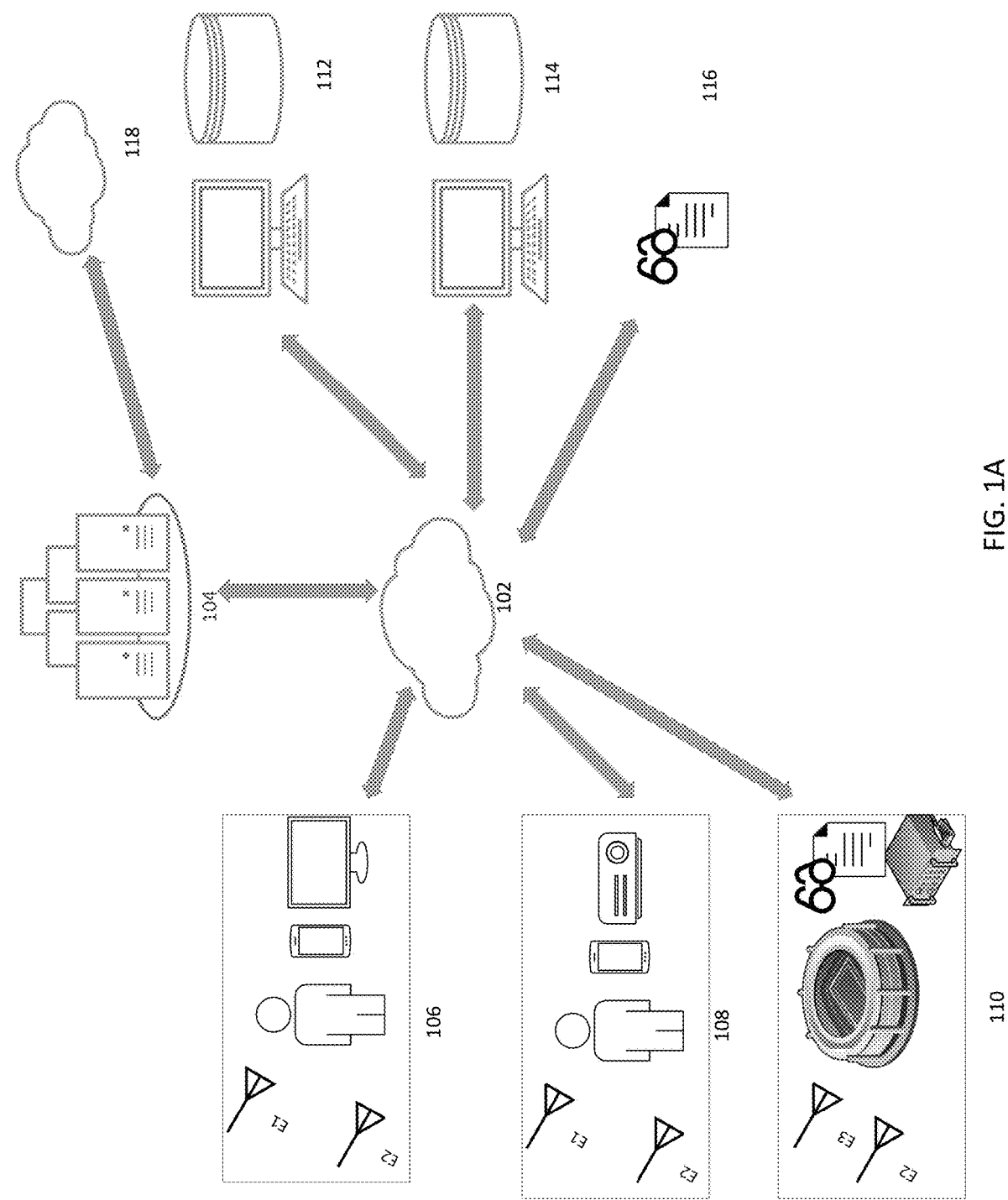
FIG. 1A illustrates an example environment.

An aspect of the present disclosure relates to augmented and virtual reality-related systems and methods. Further, certain aspects of the present disclosure relates to geo-spatial computing. Yet further, certain aspects related to associating content (e.g., visual content, audio content, computer instructions, request for data, data) with a specific 3D location in physical space (e.g., a logically bounded space) which may be accessed by humans or machines (e.g., robots, vehicles, etc.).

For example, as described herein, an augmented and/or virtual reality system may utilize a specified, addressable three dimensional geo-spatial addressable mesh (e.g., a grid) to facilitate the mapping and tracking of objects. Such objects may include animate objects (e.g., a person, animal, limb, or digit), inanimate objects (e.g., furniture, a vehicle, etc.), data cubes, and/or a digital objects to create an interactive data-scape. Techniques described herein enable content to be associated with a very precise geo-location (e.g., a bounded cell). Such content may include static content, real time, live streaming content, mapping content, computer generated animated content, color, cryptocurrency, cryptocurrency wallet, and/or other content. This is contrast to certain conventional approaches that enable content to be accessed by any device (having the appropriate authorization if needed) that is simply within range of a wireless network providing access to such content.

By contrast, conventional systems for tracking a person in physical space often produce intermittent, imprecise, or unreliable coordinates. Furthermore, conventional techniques for tracking a person do not provide a universal system of coordinates that enable three dimensional spatial locations to be universally addressable. Further, because conventional systems do not utilize a 3D virtual mesh to track movement in a physical space, and hence do not have addresses associated with mesh cells, such conventional systems fail to provide reliable persistence of digital objects or content and may only recognize a person's (or other objection's) location by matching a specifically visualized view of the environment.

Further, conventional systems for tracking a person in physical space lack an adequate solution for automating and persisting the placement of digital spatial triggers for computer executed actions that are associated with an addressable location in a three dimensional physical space.

As will be described, systems and methods disclosed herein may employed to perform spatial computing, to create, preview and deploy smart environments, coordinate events between services, and to manage and control such smart geo-spatial environments utilizing what may be referred to as an environment, spatial, operating system (SoS). Further, systems and methods are described that enable such smart environments to be shared, discovered, and interacted with. For example, mobile, web, augmented or virtual reality based spatial interfaces may be provided that enable users to design interactive environments for a physical space and to specify what data and computing elements will be available to someone in a physical space.

The systems and methods disclosed herein may facilitate and maintain a persistent reference between the physical and digital worlds and enable sharing of experiences (e.g., augmented and/or virtual reality experiences) across multiple users and devices. Further, systems and methods disclosed herein may facilitate the flow of content and data that respond to changes throughout a given environment, as compared to conventional augmented reality (AR) headsets that are not logically connected to a physical surrounding environment.

For example, programs may be used to define actions to occur when an object (or a quantity of objects) enters, is present in, and/or leaves a given portion (e.g., one or more cells/blocks, sometimes referred to herein as a data cube, even when not being of cube shape) of the mesh. The mesh may be in the form cells or of a structured grid having repeating geometrical shapes, such as cubes. The defined actions may be associated with a schedule, where different actions may be taken based on the date, day of the week, and/or time.

Optionally, cells may be grouped together as a collections (e.g., via meta-containers or otherwise), and content, actions, commands, data, triggers (e.g., spatial triggers, time triggers, etc.), programs, scheduled time periods (when respective content, actions, commands (e.g., to be issued to user devices, robots, or other machines), data, triggers, and/or programs are active) and the like may be assigned to a given collection of cells. Optionally, data cubes and/or data cube containers (which may contain multiple data cubes) may be created and maintained without content, actions, and/or commands.

For example, a geo-fence may be defined (where the geo-fence may be defined using identified/selected mesh cells/data cubes), and certain actions may be taken or commands issued when a user is detected entering, present in (e.g., for a specified period of time), and/or leaving the geo-fenced area. Optionally, data cubes and/or data cube containers (which may contain multiple data cubes) may be created and maintained without content, actions, and/or commands. Optionally, cells may be grouped together as a collections (e.g., via meta-containers or otherwise), and content, actions, commands, data, triggers (e.g., spatial triggers, time triggers, etc.), programs, scheduled time periods (when respective content, actions, commands, data, triggers, and/or programs are active) and the like may be assigned to a given collection of cells.

By way of further example, a change in state in an environment, passive or active participant interactions with the environment, time changes, and/or an automated trigger can trigger individual, local, remote, or distributed software applications to start, stop, or run based on automated event triggers or live events. Examples of changes in state include changes in time, security, privacy, location of people, objects, or other data cubes, or data cube meta-container, biometric changes, situational changes (e.g., emergency vs. non-emergency), automated or programmatic initiated changes of state, and/or other changes in state.

An active interaction may include an interaction where the user is consciously and immediately interacting with system services (e.g., touching or pointing at a digital object via a touch display, augmented reality system, or virtual display). A passive interaction may include interactions where the user is not consciously interacting with the interactive environment (e.g., interactions that have been put in place to function automatically without requiring the active involvement of a user, such as by the user simply walking through designated location/mesh cells, and where the user may optionally not even be aware of entering an interactive environment).

As noted above, programmed actions may be associated with cells. Example actions, without limitation, may include the presentation of specified content (which may include augmented reality (AR) and/or virtual reality (VR) content) on a user or other device (e.g., audio, video, text, images, color, and/or other data types), a transmission of a notification to a destination, the movement or activation of a physical object (e.g., a robot, drone, door, solenoid, etc.), the movement or activation of a digital object, the transfer of cryptocurrency, the triggering of blockchain events or postings on a blockchain, the transmission of commands (e.g., to perform certain actions, to provide data, etc.) to IoT (Internet of Things) devices, robots, or other machines, and/or the triggering or stopping of another program (e.g., a distributed software application).

By way of further example of the association of actions with location and user movement, if the user in a physical space is viewing a given data cube associated with a given physical location from the left side, a first side of an item of virtual content may be caused to be rendered on the user's device (in 2D or 3D), while if the user views the same data cube from the right side, a different side of the item of virtual content may be caused to be rendered.

In addition, optionally programs associated with a given location (corresponding to one or more cells in a two or three dimensional mesh) may be used to dynamically control other cells/data cubes. For example, a program associated with a cell may block or hide one or more data cubes when certain conditions are met. By way of illustration, if a user is in a position to view a cell, the system may determine that the user is not interested in content associated with the cell. The system may determine that the user is not interested in content using preference information in the profile of the user or in response to a specific instruction from the user (e.g., received via a visual or voice input user interface) not to be presented with content associated with that particular data cube or group of cubes. If the system determines that the user is not interested in content associated with the cell, the cell (and associated content), the cell may be "hid" with respect to the user so that the cell content is not rendered by the user's device.

By way of further example, if it is determined that there are insufficient computer or network resources currently available to transmit or render certain content associated with a cell, the cell (and associated content) may be "hid" with respect to the user so that the content is not rendered by the user's device. Once sufficient resources become available to render the cell content, the cell may be "revealed" so that the cell content is rendered on the user's device.

To facilitate the quick creation of an interactive environment, and reduce the computer resources needed to create an interactive environment, data, commands, rules, triggers, programs (e.g., computer executable code), and/or actions (and associated time periods when such data, commands, rules, and/or actions are active) associated with a given cell (or set of cells) may be copied and pasted by a user via a corresponding interface (e.g., a graphical user interface that displays a representation of the cells) to one or more other cells or sets of cells (e.g., by pasting the copied items on a representation of the cell).

The system may optionally be controlled by and/or interact with various types of learning machines and artificial intelligence algorithms. For example, machine learning engines and artificial intelligence algorithms may be utilized to perform predictive association of data with locations in physical two or three dimensional space, as described in greater detail elsewhere herein.

As similarly discussed above, A user device may be configured to layer a digital augmented reality content on top real world elements for display and/or for sound production. For example, a user device, configured (with hardware and/or software) to render AR content in 2D or 3D in conjunction with physical, real-world environment, may be in the form of a camera, a camera equipped smartphone, a camera equipped tablet, a laptop, smart glasses, a smart watch or other wearable (e.g., a smart pendant, necklace, ring, earing, body jewelry, other jewelry, clothing item with display(s), lighting elements, and/or speaker(s)), a brain-system interface (e.g., a neural-control interface that enables bi-directional communication between a human brain and the system), a paddle with lighting elements, a haptic equipped device (configured to provide an illusion of substance and force by applying forces, vibrations, or motions to the user to simulate the sensations that would be felt, via a sense of touch, by the user interacting directly with physical objects), a heads-up display (HUD), a holographic display, headphones, earbuds, drones, robots, lighting devices (e.g., LED, LCD, OLED, incandescent bulbs/panels), automobiles, etc.

Optionally, a given AR device may be self-contained computing device that can wirelessly access remotely stored and/or rendered content (e.g., stored on a cloud-based storage system, on a web server, generated by an animation/game system, etc.). Optionally, a given AR device may utilize an external power supply, an external computer computing device, and/or a remote network access point.

An augmented reality headset may provide a simulated visual environment through physical display optic lenses or projectors (e.g., one display/projector for each eye (to enable content to be rendered in 3D), only one display/projector for one eye, or a display/projector shared by both eyes), allowing the user to see both a digital, computer generated display (e.g., of text, images, graphics, colors, etc.) and the world viewed through clear lenses or captured via a camera through the glasses. An augmented reality headset may include sound transducers (e.g., speakers) providing stereo/multi-channel sound, head motion tracking sensors (e.g., gyroscopes, accelerometers, magnetometers, etc.), and/or eye tracking sensors (which may include a light emitting device and a camera to detect reflections of light from the user's eye to determine in what direction the user is looking).

Optionally, a user device may be a virtual reality device, such as a virtual reality headset/goggles (e.g., having a stereoscopic display (providing separate images for each eye), stereo/multi-channel sound, head motion tracking sensors (e.g., gyroscopes, accelerometers, magnetometers, etc.), and/or eye tracking sensors (which may include a light emitting device and a camera to detect reflections of light from the user's eye) and/or haptic gloves. The virtual reality device may provide a more complete immersive experience and may isolate certain senses (e.g., sight, touch, and/or hearing) from being able to view, hear, and/or touch the real world directly (as opposed to on an electronic display or via a sound reproduction system).

Thus, experiences may be provided local to the physical, real-world environment (e.g., the interior of a convention center, a concert venue, a stadium (e.g., on a playing field, in a seating area, in a corridor), a museum, a factory, an office building, a home, a theme park, a mall (e.g., in a store, in a corridor, on an elevator, at a doorway), etc.), and/or may be provided remotely from the physical, real-world environment (e.g., at home or other location experience, optionally by providing streaming content from the physical, real-world environment).

Optionally, a given venue may have multiple cameras positioned therein to provide (e.g., via user device displays) remote viewing, live-streaming, and future replays of (stored) events from multiple camera points of view.

As similarly discussed above, the processes disclosed herein may be implemented using a 3D Spatial Operating System (SOS) which may provide an interface between other software and hardware disclosed herein. The SOS may be modular and enable plugins to be added to thereby ease adding functionality and customization. Further, the processes disclosed herein may be implemented using any combination of local device based processing, edge computing (computing preformed using devices at or near the source of the data being used, to thereby reduce latency), and/or mesh computing (a local network topology in which the infrastructure nodes (e.g., bridges, switches, and/or the like) connect directly, dynamically and non-hierarchically to other nodes and cooperate with each other to route data from/to clients), and/or cloud-based computing.

With respect to cloud-based computer, a cloud system may comprise a hosted computing environment that includes a collection of physical computing resources that may be remotely accessible and may be rapidly provisioned as needed (sometimes referred to as a "cloud" computing environment). Certain data described herein may optionally be stored using a data store that may optionally comprise a hosted storage environment that includes a collection of physical data storage devices that may be remotely accessible and may be rapidly provisioned as needed (sometimes referred to as "cloud" storage).

Certain aspects will now be discussed in greater detail.

As noted above, systems and methods disclosed herein may be utilized to associate three dimensional (3D) spatial environments with an addressable mesh, and optionally associate content and/or other data with specific addresses on that mesh. A 3D mesh for a given space may be defined or modified via a user interface to include a homogenous or heterogeneous set of 3D shapes, which may be of different sizes. For example, a homogenous or heterogeneous 3D mesh may be defined for a given physical space (e.g., the interior of a convention center, a concert venue, a stadium, a museum, a factory, an office building, a mall, a boardwalk, a home, a theme park, etc.).

The mesh may include, by way of non-limiting example, a grid of cubes (e.g., data cubes) of one or more sizes (e.g., 0.5 cm×0.5 cm×0.5 cm, 2.5 cm×2.5 cm×2.5 cm, 15.24 cm×15.24 cm×15.24 cm, etc.), a grid of cuboids of one or more sizes (e.g., 1.5 cm×1.5 cm×0.5 cm, 2.5 cm×2.5 cm×1.5 cm, 10 cm×7 cm×5 cm, etc.), a mesh of spheres of one or more sizes (e.g., 0.5 cm diameter, 2 cm diameter, 20 cm diameter, etc.), a mesh of cylinders of one or more sizes, a mesh of cones of one or more sizes, a mesh of triangular prisms of one or more sizes, a mess of prisms with hexagonal bases of one or more sizes, a mesh of pyramids of one or more sizes, other polyhedral, or any combination thereof. A user interface may optionally be provided that enables the size and shape of each cell or of a set of cells to be modified. Optionally, one or more menus may be provided that enables a cell shape and/or size to be selected from a predefined set of cell shapes or sizes.

There may be benefits to having relatively smaller cells, as well as disadvantages. A higher density of cells facilitates a higher degree of data 'resolution' or relatively more data points. As mesh cell physical dimensions become smaller, and the number of cells in a physical area becomes correspondingly larger, data resolution may increase proportionally. However, the amount of memory needs to store a larger number of cells may increase, and the number of sensors needed to implement smaller cells may increase as well.

With respect to addressing, a mesh address may be provided to a user or software application to enable the physical location associated with the address to be precisely identified and located by the user or software application. Addresses can optionally be made publicly available and mapped to corresponding domain names via a system of name registration and lookup. Such mapping of addresses to domain names may be static or dynamic. Thus, an application (e.g., a browser) may utilize the address to view content or execute programs associated with a mesh address by accessing the mesh address.

It is understood that although a mesh cell may be associated with a mesh address, a cell is not necessarily synonymous with its address, and a cell may be moved independently of the address (where the address for the cell optionally may change to correspond to the new location, where the address may reflect the new location coordinates). Optionally, mesh cells may not be associated with an address corresponding to a global coordinate system, but may instead be associated with distance and location information referenced to a tracking sensor (e.g., an antenna) at the physical location.

Certain example tracking techniques will now be described. Movement (and optionally the speed of movement and/or acceleration) of objects through the virtual mesh in a given space may be monitored and tracked (optionally in real time) using one or more types of devices and optionally using indoor positioning systems. The content presented to a user may be dynamically modified or generated to reflect the user's movement and/or the movements of objects in the user's proximity.

By way of illustration, a local positioning and response system may be utilized that includes transmitters and antennas/emitters located within a physical space (e.g., fixed to a pole, a building structure, a mountain, a platform, etc.) that transmit shaped beams (e.g., radio frequency (RF) beams, sound beams having a frequency outside the range of human hearing, light beams having a frequency outside the range of human vision, etc.), and that includes devices that receive the shaped beams (optionally including reflections and/or distortions thereto), to thereby deploy a virtual three dimension coordinate grid into airspace. For example, a single antenna may provide over one millions lines of connectivity. The local positioning and response system may identify the position of an object in mesh specified for a defined area.

By way of further example, imaging devices (e.g., cameras), LIDAR devices, and/or millimeter wave radar systems (e.g., operating at 76-81 GHz) may be used to track objects moving within a mesh associated with a defined space. By way of still further example, WiFi and/or Bluetooth tracking of user devices may be utilized via WiFi access points and Bluetooth beacons, to track user device (and hence user) positions. Optionally, location information may be derived from detected radio signal (e.g., WiFi signals) reflections or perturbations caused by an object being tracked.

Optionally, a given object (e.g., a robot, drone, IoT device, etc.) may report its location (as determined by the device via GPS, WiFi, inertial guidance, etc.) back to the system. The system may then provide commands (e.g., updated commands) to the object and/or to different devices based on the device's current location, current date/time, and/or other factors (e.g., the proximity of other devices, users, or stationary structures in the proximity of the device's current location).

Location coordinates may be received from a wearable or other radio frequency (RF) based circuit (e.g., embodied in a chip) attached to or embedded in gloves, handsets, or clothing, or attached to a phone, an augmented reality headset or other object carried by or attached to an object to be tracked. Optionally, location information may be derived from some form of optical input from a cameras or other optical device, and it may also optionally use radio reflections for 3D tracking or visualization of position. Tracking methods can be device-based, or device-free, and certain tracking technique may utilize one or more sensors attached to the tracked person or object.

In addition, GPS signals (or other space-based satellite navigation system signals, such as Glonass, Galileo, Beidou signals) when receivable by a user device may be used to determine the location of the user device within a certain resolution (e.g., 2 or 3 meters).

Optionally, the indoor positioning system may detect an object pose or orientation by detecting object landmarks (e.g., the nose or eyes of a person). Optionally, the indoor positioning system may perform simultaneous location and mapping (SLAM) with respect to tracked objects.

Optionally, certain devices (e.g., mobile computing devices, such as phones or wearables) may determine their own orientation (e.g., using an internal accelerometer) and wirelessly report their orientation (which may then be used in determining how to perform ray tracing in computer generated augmented reality content and/or for other purposes).

For example, coordinates from an RF circuit on a user device or other tracking device may be streamed to a database and further analyzed, compared with mapped areas, etc. By way of illustration, mapped areas from a point cloud of the given physical location may be calibrated against known coordinates related or referenced to an antenna position, and the user position may be determined in relationship to the antenna.

Certain example illustrative use cases will now be described. In one example, if the content is a virtual line overlaying a floor to show a safe path through a warehouse and a forklift is moved to block the path, the system may modify the virtual line to navigate around the forklift. By way of further example, if the physical environment is a sporting event, and the user is pointing a first player on a playing field, the system may cause data regarding the first player to be rendered by the user's device in association with an image of the first player. If the user then points to a second player on a playing field, the system may cause data regarding the second player to be rendered by the user's device in association with an image of the second player. By way of yet further example, if the user is engaging in an interactive game associated with a physical environment, as the user walks through the physical environment, augmented reality data comprising avatars of different players, images of tokens, or other objects may change. By way of still further example, if the system detects that the user is moving a right hand towards the left side of a mesh cell in a pushing motion, a corresponding virtual item may be rendered so as to appear to be pushed to the right.

The assignment of addresses to 3D spatial locations will now be discussed in further detail. As similarly discussed above, a logical addressing scheme (e.g., a 2D or 3D addressing scheme) may be utilized which resolves to resources associated with logical maps (e.g., meshes) that correlate to two-dimensional or three-dimensional spatial locations. Data and programs can dynamically be associated with a given two-dimensional or three-dimensional spatial address. For example, a point cloud may be generated of a 3D space (e.g., using a laser scanner (e.g., LIDAR), from architectural drawings, using radio waves, 3D maps, and/or other using other mapping techniques). The point cloud may be utilized to generate a digital 3D model of the space. Optionally, surface reconstruction may be performed on the model. The data points may be converted to an array of adjacent values that can be used to define logical addresses. Optionally, such a logical address can be combined with high precision GPS notation for latitude and longitude.

Addresses may also be referenced dynamically in relationship to a local space (e.g., related to a tracking sensor/antenna) or a global 'world space'. An example address may be in the form of decimal degrees, degrees and decimal minutes, degrees-minutes-seconds, World Geodetic System format, or other form. An example address is as follows: 33.123.967.22.104. Thus, a mesh of logical addresses of mesh cells may be correlated with the point cloud to provide referential relationships between the 3D physical space and the logical mesh addresses.

As similarly noted elsewhere herein, the system enables the programming and automation of triggers based at least in part on physical and/or logical events that can start, stop, and run software applications, cause the rendering of computer generated and/or other content and data (on user devices or on devices with display and/or speakers in the proximity of users), and/or cause physical devices (e.g., robots, elevators, other motor controlled devices, lights, etc.) to perform commanded actions (e.g., guide delivery drones, assist self-driving vehicles, etc.). Thus, the air space around a user may be associated with information that the user can see, use, and interact with (e.g., via a user device or other device).

The design and modification of an interactive environment will now be further discussed.

For example, a menu of meshes and/or physical spaces may be provided to a user (e.g., a grid designer or an end user). A user may select a listed mesh or physical space. A user interface may display all or a portion of the mesh in combination with an image or model of the corresponding physical environment. The programs, content, and/or available interactions associated with a given cell/data cube may be displayed (e.g., optionally in response to touch or pointing at the cell with a finger or camera-equipped device). The user may then point at or touch a data cube and drag it (and its associated programs, content, triggers, etc.) from one location in the 3D mesh (corresponding to a first physical space) to and drop it on another location in the 3D mesh (corresponding to a second physical space). For example, if a data cube is dragged to a different location (e.g., the location of another data cube), the dragged data cube may replace the previous data cube. Optionally, the dragged data cube may be automatically replaced with an "empty" data cube that does not have any programs, actions, commands, and/or content associated with it.

For example, optionally a person may be enabled to reach out and touch an augmented reality representation of a data cube, add content to the data cube, drag and drop the data cube from one location to another, and/or select or activate the data cube to reveal the data cube contents.

Content may be manually placed on mesh cells or placed through an automated placement process. Similarly, content may be manually moved or moved through an automated movement. The placement and movement of content may be performed independently of other content or based on relationships to other content, movements of users, user preferences, environment variables, and/or digital or physical triggers. Content may be placed or moved using six or more degrees of motion (e.g., forward/backward (surge), up/down (heave), left/right (sway) translation in three perpendicular axes, combined with changes in orientation through rotation about three perpendicular axes (yaw (normal axis), pitch (transverse axis), and roll (longitudinal axis)).

Thus, the system may enable the dynamic placing, distribution, positioning, sharing, and addressing of data and applications in three dimensional physical space, and may enable users to interact with such data and applications. As similarly discussed elsewhere herein, data may be associated with one or many visual, audio, touch, or other perceptible sensory elements.

Further, because a user's geo-location (or the location of a user's head/eyes) may be precisely known, as well as the content that the interactive environment has presented or will present to the user, advertising (e.g., augmented reality content) or other content may be highly personalized and contextualized for participants in interactive environments (e.g., based on user profiles, time of day, physical location, etc.). If the user's profile is identifiable, the profile may be accessed and further used to personalize the interactive environment. User profiles are discussed in greater detail elsewhere herein.

Optionally, multiple channels or items of content may be associated via a user interface with a given geo-location (e.g., geo-fence, meta-container, cell, etc.). A channel (a set of content which may have a common theme or source) may be selected an displayed to a given user in the geo-location based on user input (e.g., a user selection from a menu of channels presented on a user device or a device dedicated to the geo-location), the user's profile, the user's movement, the user's anticipated movement, and/or the date/time of day.

Optionally, if the user is physically present in the physical environment corresponding to the mesh, an image, avatar or other digital representation of the user may be displayed in a representation of the mesh (e.g., via a user display device) based on the determined location coordinates of the user or a user device. The user may then use a user input device (e.g., a touch screen, mouse, touch pad, pen, voice input device, game controller, keyboard, eye tracker, brain-computer interface, imaging device, hand gesture detector, etc.), in combination with the display of the representation of the user in the mesh to change the placement of data cubes or other objects that associated with the physical location corresponding to the data cubes. A user may be able to interact with other users (e.g., via avatars representing other users) via an augmented or virtual reality interface corresponding to the physical environment.

Optionally, mesh modification data, physical and/or digital object path and motion tracking data, physical or digital action data, space models, and/or other data may be output to and stored to blockchain histories.

For example, if inventory of a product or products is being performed, the tracking mechanisms disclosed herein may be utilized to capture the physical paths of inventory as it moves (e.g., via a forklift, conveyor belt, hand carried, or otherwise transported) through a facility (e.g., manufacturing plant, warehouse, retail establishment, etc.). The coordinates (e.g., logical mesh addresses) corresponding to those paths, the identification of the inventory being moved (e.g., part numbers), product information, and/or the times corresponding to when the inventory passed through the coordinates, may be recorded on a blockchain (e.g., in order to comply with quality assurance directives and to reduce waste). The blockchain records may be later analyzed and viewed (e.g., via an augmented reality headset, phone, or other user device) in order to gain insight into manufacturing or business processes and optimize the flow of materials used in product production.

As discussed elsewhere herein, machine learning engines and artificial intelligence algorithms (e.g., that utilized a deep neural network) may be utilized to perform predictive association of data with locations in physical three dimensional space. For example, machine learning engines and artificial intelligence algorithms may be utilized to evaluate, optionally in real time, the flow of objects, such as foot traffic, through a physical location, and then based on the time of day, predict what the flow of traffic may be within a short period of time (e.g., the next 5 minutes, the next hour, etc.) or on the following day, and using the prediction, select content (e.g., augmented reality advertising, a music video, etc.) to be served to and rendered by a user device (or other device in proximity with the user) at a specified future time (e.g., the 5 minutes or the next day at a corresponding time of day if the user enters a specified mesh cell).

Optionally, the learning engine may utilize reinforcement learning, where machine learning models are trained to make a sequence of decisions. The learning engine may learn to achieve a specified goal (e.g., related to causing people to move to a specific location or performing other desired action) in a complex environment. In reinforcement learning, an artificial intelligence faces a game-like situation. The learning engine may utilize trial and error to generate a solution that will achieve the desired goal. Incentives and disincentives may be utilized, where the learning engine may be rewarded when performing a desired action or may be penalized when performing an undesired action. Thus, the learning engine will attempt to maximize the total reward, resulting in a solution to achieve the specified goal.

Examples of goals may include the following: having a certain number of people move to a certain physical location in the interactive environment at a certain time (e.g., by informing people via respective devices that highly desirable content, such as virtual prizes or video content, will be displayed to people in that location at a specified time), causing people to be more evenly distributed in a physical environment (e.g., by identifying to different sets of users different locations and/or times where certain desirable content may be accessed), etc. Other example goals may relate to optimizing foot traffic and/or vehicular traffic in a given environment.

By way of illustration, a deep neural network may utilize an autoencoder architecture (including an encoder and a decoder). The CNN may include an input layer, one or more hidden layers, and an output layer. The neural network may be configured as a feed forward network. The neural network may be configured with a shared-weights architecture and with translation invariance characteristics. The hidden layers may be configured as convolutional layers (comprising neurons/nodes), pooling layers, fully connected layers and/or normalization layers. The convolutional deep neural network may be configured with pooling layers that combine outputs of neuron clusters at one layer into a single neuron in the next layer. Max pooling and/or average pooling may be utilized. Max pooling may utilize the maximum value from each of a cluster of neurons at the prior layer. Average pooling may utilize the average value from each of a cluster of neurons at the prior layer.

When configured as an autoencoder, the neural network may be configured to learn efficient data (traffic) codings in an unsupervised manner. An autoencoder may be utilized to perform traffic (e.g., foot traffic) predictions for a given location that has an associated addressable mesh. An autoencoder may attempt, with a reduced dimensionality, to replicate input vectors at the output layer with a reduced set of neurons/nodes.

For example, the autoencoder encoder may generate a vector representation of historical traffic (e.g., foot traffic) levels at one or more mesh addresses and their correlations using one or more encoding layers. The autoencoder decoder may then generate a representation/prediction of the traffic at the one or more mesh addresses at a future time point using one or more decoding layers. An error function, such as mean absolute error function and/or a weighted mean squared error function, may be used to evaluate the traffic prediction performance of the neural networks and to adjust the neural network weights. For example, a given node edge may be assigned a respective set of weights. Backpropagation may be used to adjust the weights each time the error is calculated to improve the autoencoder performance.

As discussed, certain actions can be taken based on the determination of a user location within a defined mesh or based on the traversal of a geo-fence. In addition or instead, other factors may be taken into account in determining what actions to take. For example, certain actions may be triggered based in part on a detection of low physical inventory levels for a given product, the number of people entering or exiting a building over a specified time period, the weather, the time of day, a request by a third party for rendering of the third party content on user devices at certain locations, and/or the like.

Certain rules may be associated with a geo-fence or one or more data cubes. For example, a creator of an interactive environment or an owner of a physical location associated with an interactive environment may specify that certain types of content may not be associated with the interactive environment at all or within certain time periods. For example, a user interface may be provided enabling an authorized user to specify that no advertisements are to be displayed via the interactive environment associated with a given location during certain days and/or during certain hours. By way of further example, a user interface may be provided enabling an authorized user to specify that violent and/or sexual content are not to be rendered via the interactive environment associated with a given location. By way of yet further example, a user interface may be provided enabling an authorized user to specify that audio content is not to be associated with the interactive environment associated with a given location.

As will be described, visual design tools and interfaces may be provided which enable users to define an interactive environment. Such tools and interfaces may enable a user to view a visualization of a physical space (e.g., a model of photograph), lay out active areas within the physical space, indicate which user interactions are to take place and at which geo-spatial locations such actions are to take place, and associate various types of content with geo-spatial locations. The user can then preview and test the defined interactive environment. When the defined interactive environment is ready to be deployed, the defined interactive environment may be published immediately (at which point the interactive environment is active and ready for interaction with users) or a user may schedule the interactive environment publication to become active on a designated date and time.

Once the interactive environment is deployed, a user may be able to access tools and user interfaces (e.g., web-based or app-based tools and user interfaces) to remotely monitor user interactions with the interactive environment and to modify, update, and re-deploy the interactive environment or a selection subsection thereof.

Optionally, a channel may be defined with respect to interactive environments and/or related content that provide a collection immersive experiences for users.

A given interactive environment may be released to specific geographic locations or deployed to a global network. A given interactive environment may be created as and deployed as either or both a web based or native mobile applications which may interface with and communicate with system services (e.g., core services, microservices, etc.) via one or more application programming interfaces.

As discussed elsewhere herein, the system may provide commerce services. For example, interfaces may be provided that enables the buying and selling (or licensing) of digital and physical items (e.g., digital content, clothing, and/or other products). The system may support such commerce by providing crypto-currency and/or digital wallet support. The system may also enable user to provide social tipping (e.g., using crypto-currency and/or the digital wallet) so that users may transmit 'tips' (e.g., small amounts of currency) to content creators (e.g., whose content the user has viewed or listened to via the interactive environment).

The interactive environments may provide enhanced social interactions and community building via group, interactive environment, experiences.

Referring now to the drawings, FIG. 1A illustrates an example architecture. A system 104 is configured to provide location-based augmented and/or virtual reality experiences as described elsewhere herein. Such augmented reality experiences may include, by way of example, video content, audio content, computer games, navigation data, commerce transactions, the activation of robotic devices, triggering of blockchain events or postings on a blockchain, transmission of commands to IoT devices, and/or the triggering or stopping of one or more programs.

The system 104 may be configured with one or more network interfaces to connect to one or more networks 102 (e.g., the Internet, an intranet, a system area network, a wide area network, wired network, wireless network, and/or other network). The system 104 may be configured as a cloud system that includes a collection of physical computing resources that may be remotely accessible and may be rapidly provisioned as needed. The system 104 may include dedicated server systems.

The system 104 may also be configured to perform spatial computing, and enable authorized users to create, preview and deploy smart geo-spatial environments (which may be associated with one or more defined meshes), coordinate events between services, and to manage and control (e.g., create, share, discover and interact) such smart geo-spatial environments. The system 104 may host a spatial operating system (SoS) as described elsewhere herein.

The system 104 may communicate, via network 102, with devices (e.g., mobile smart phone, AR headsets, fixed displays, etc.) at one or more physical locations 106, 108, 110 (that may be associated with respective meshes with associated mesh cell addresses). One or more antennas E1, E2 (and/or other tracking detectors), may be located at a given location, and may be configured to track users, user limbs, user eye positions, user or vehicle paths, and/or the like in two or three dimensions. The system 104 may receive tracking data from the antennas E1, E2 and store such data (e.g., on a cloud storage system, a dedicated storage system, a blockchain, etc.). A physical location 110 may have one or more edge servers located therein (e.g., to provide a network entry point).

The system 104 may determine, based on the tracking data, whether user or other movement through or presence at a given geolocation (e.g., a mesh cell or container) corresponds to an action trigger. The occurrence of an auction trigger may cause one or more actions to occur. Example actions, without limitation, may include the presentation of specified content (e.g., audio, video, text, images, and/or other data) on a user device (e.g., a smart phone, a wearable device, augmented reality headset, etc.) and/or another device (e.g., by a video projection, a flat panel display, etc.), a transmission of a notification to a destination, the movement or activation of a physical or digital object, the transfer of cryptocurrency, triggering of blockchain events or postings of records on a blockchain 118, transmission of commands to IoT (Internet of Things) devices, and/or the starting or stopping of another program.

The interactive environments implemented via the illustrated systems and devices may respond to changes in the environment and may be self-modifying. Events may be assigned so that when a given event occurs, the detection of such occurrence may cause a corresponding process to begin, continue, or end. One or more thresholds may be specified that cause certain process states to be launched. Such thresholds may be configured via a user interface (e.g., an administrative console 112). The administrative console may be used to design interactive environment, specify the location of data with respect to physical areas, associate and map addresses in a mesh, control privacy settings (e.g., system wide privacy settings, privacy settings that apply within a defined geo-fence, privacy settings on a meta-container by meta-container basis, privacy settings on a data cube by data cube basis, etc.), activate and deactivate features, set preferences, monitor participants in the interactive environment, etc. The administrative console may be hosted on or accessed via a mobile communication device (e.g., a cell phone), laptop computer, head-wearable display (e.g., augmented or virtual reality headset/goggles), desktop computer, tablet computer, interactive television, game console, and/or the like.

As noted above, an administrator may specify privacy settings. Such privacy settings may specify for users or objects within a specified portion of an interactive environment (e.g., a particular, data cube, meta-container, geofence, etc.) and/or for a specific time period, whether the actual identify of users will be shared with other users, what user demographic information will be shared between users and/or with advertisers, what user or object movement/location information may be stored or shared with other users or third parties, and/or the like.

Users remote from the physical locations 106, 108, 110 may interact with users, devices, and content at the physical locations 106, 108, 110 via user terminals 114, 116.

Figure 1B:
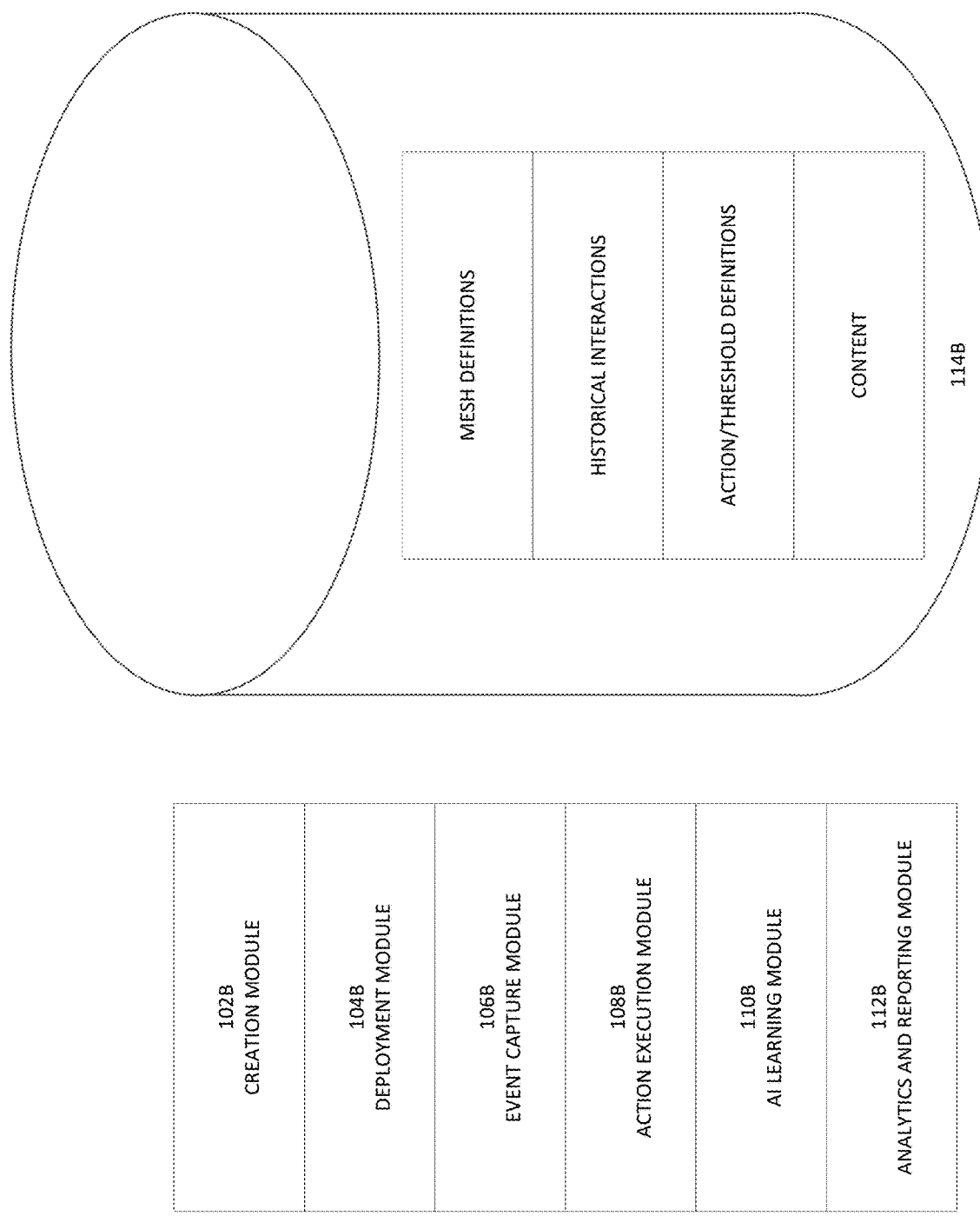
FIG. 1B illustrates an example system configured to provide location-based augmented and/or virtual reality experiences.

FIG. 1B illustrates an example implementation of the system 104. A data store (which may optionally be a cloud-based data store) may be configured to store:

mesh definitions for one or more locations,
images and/or models of the locations,
historical interactions with interactive environments (e.g., user or object paths traversed through interactive environments, data/content interacted with/viewed, actions triggered, messages left and accessed, etc.) which may be stored in association with time stamps and location, user, and/or object identifiers,
action definitions,
action triggers,
trigger thresholds, and/or
content (e.g., to be rendered on a user or other device in response to a trigger).

The system 104 may include one or more modules (which may be used to provide one or more of the services described herein). For example, the modules may include a creation module 102B that provides user interfaces and tools that enables users to create interactive environments, define meshes for physical spaces, define actions associated with mesh cells and containers, define action triggers, define action thresholds, etc. A deployment module 104B enables a defined interactive environment to be deployed to be interacted with at a corresponding physical location.

An event capture module 106B captures events that occur with respect to a given interactive environment (e.g., user or object movements through mesh cells, triggering of content displays, device activations, messages left and accessed, blockchain postings, commerce transactions etc.).

Thus, example, the movement, actions, and/or events of or related to data cubes, meta-containers, people, objects, IoT devices, bots, artificial intelligence assistants, and other participants in the system may be captured to a blockchain record. Blockchain records can also be read in order to determine how to position data cubes and/or respond to changes in the movements or actions of data cubes, meta-containers, people, objects, IoT devices, bots, artificial intelligence assistants, and/or other system participants.

An action execution module 108B is configured to execute actions described herein (e.g., in response to triggers).

An artificial intelligence learning module 110B may be configured to perform predictive association of data with locations in physical three dimensional space. For example, machine learning engines and artificial intelligence algorithms may be utilized to evaluate the flow of objects, such as foot traffic, through a physical location, and optionally based on the time/day, predict the flow of traffic at a specified data/time. The prediction may be used to select content (e.g., text, video, still image, and/or other content) to be served to and rendered by a user device (or other device in proximity with a user at a specified future time (e.g., the next day at a corresponding time of day).

Machine learning engines and artificial intelligence algorithms may be used to enhanced user experiences based on events occurring in proximity to the user. By way of further example, machine learning engines may be used to evaluate and forecast trends, monitor and predict the physical movement of people and objects, and discover useful information related to the physical environments where an interactive environment may be deployed. Optionally, a machine learning engine (e.g., a time delay neural network that utilizes a long short-term memory network neural network topology, a random forest topology, a gradient boosting regressor topology) may perform some or all of the foregoing functions via time-series analysis, although other techniques may be used.

The system 104 may be configured to identify a user at a location where an interactive environment is deployed using one or more techniques. For example, a user that has a registered account accessible by the system 104 may be identified via an account registration process and the pairing of a device associated with the user (e.g., an RF tracking device or user phone) to the user account. By way of further example, biometric techniques (e.g., facial recognition of facial images captures by cameras in the physical location) may be used to generate a facial fingerprint of a given user and the generated facial fingerprint may be compared to those stored in a database to identify the corresponding user record. The user identity may be utilized to access a corresponding user profile to provide customized interactions and content, and to store user behavior data in association with the user profile.

Guest users (those without an account record) may be assigned anonymous identifiers (e.g., an alphanumeric identifier) that are generated automatically by the system 104.

An analytics and reporting module 112B may be used to analyze historical interaction data store in the data store 114B and generate corresponding reports. For example, the analytics may include average and peak foot or vehicular traffic for a specified time period for one or more specified mesh cells or containers, identify the most (e.g., top 10) user traversed mesh cells or containers for a given physical location, the number and type of actions executed at a given cell, container, or mesh, and/or the like.

The analytics and reporting module 112B may be used to identify interesting spikes, pre-spikes, patterns, and/or pre-patterns (e.g., on a sample-by-sample basis, over a selected time frame, etc.), and optionally such patterns may be correlated with corresponding content rendered at corresponding locations or actions taken with respect to corresponding locations. For example, analytics and reporting module 112B may be used provide multivariate time series reporting and forecasting (e.g., to enable multiple dimensions to be compared over time, trends to be spotted, and/or seasonal changes in data to be detected and highlighted).

By way of further example, the analytics and reporting module 112B may be used to identify collected data stored in memory devices that does not correlate or indicate a relation to user actions of interest. Such data may then be deleted to conserve memory, and resources, such as power, used by such memory.

Thus, the system may enable a user to program life experiences by spatially engineering interactive data-scapes of discovery (e.g., content, data, actions, etc.) that facilitate collaboration among users within the data-scape and remote users. The techniques described herein may be utilized to augment physical space and influence how users interact with the world. As described herein, each geo-spatial cell within a physical area may contain data that is interacted with and affected by the users and objects.

Example services offered by the system 104 (optionally using resources/data provided by third party systems) may include one or more of the following:

Geolocation Services which may track streaming location data of users walking through or interacting with an interactive environment (e.g., where users are tracked using techniques described herein and that have opted in to having the position tracked (e.g., via a tracking beacon carried by the user).

Events Services: enables the creation, reading, writing, updating, and/or deletion of events (e.g., associated with one or more cells or containers).

Game Interaction Service: enables the creation, reading, writing, updating, and/or deletion of games. In addition, the system 104 may host a library of pre-programmed game interactions and games. Optionally, the library of pre-programmed game interactions and games may be modified and extended to customize user experiences or create new experience which may optionally combined with precise geo-location of game participants to provide new, and enhanced opportunities for live on-site and/or at-home gaming. Optionally, users local to the physical space associated with the game and/or users remote from the physical space associated with the game may play the game and interact with local and remote other gamers.

Environments Service: enables the creation, reading, writing, updating, and/or deletion of interactive environments.

Commerce Services: enables commerce transactions to be conducted via the system and/or interactive environments.

Messaging Services: enables a text, audio, graphic, augmented reality, virtual reality, and/or animated message to be transmitted to/associated with a data cube or container at specific three dimensional coordinate of physical airspace (e.g., so that when a user enters data cube or container, or points a user device at the data cube, the message may be rendered on a user or other device) and enables the user move the message to a destination data cube or container associated with a different coordinate of physical airspace for another user to view when passing through the destination data cube or container.

Lighting Control Services: enables a user to select a color via a user interface assign the selected color to a position in physical space (e.g., a data cube or container associated with a specified coordinate in air space); the color information and the position may be broadcast (e.g., via a wireless or wired interface) to a lighting device (e.g., an LED, incandescent, LCD, OLED, halogen, etc. fixedly mounted to wall, ceiling, floor, poll, or carried or worn by a user in the form of a wearable device or phone) at the specified position (e.g., if the user selects green, blue, and red for the respective physical areas, and then walks into the corresponding positions defined to be green, blue, and red, the lighting device will change colors appropriately as the user traverses from one position to another).

Content and CDN (content delivery network) Services: enables the management, creation, association, reading, writing, updating, distribution, and/or deletion of interactive environment content and applications. Enables the connection of geo-located interactive environments to one another (e.g., to extend interactive environments, to enable a geo-trigger in one environment to cause an action to occur in another interactive environments, etc.).

User Registration and Management Services: enables users to securely register, manage permissions and passwords, and pair/register their devices with the system.

Analytics and Reporting Services: provides analytics and reporting on user engagement, journeys, preferences, and interactions with respect to interactive environments; provides multivariate time series reporting and forecasting (to enable multiple dimensions to be compared over time, trends to be spotted, and seasonal changes in data to be detected and highlighted). For example, a machine learning engine may be used to evaluate and forecast trends.

The system 104 may host or provide access to a search engine that enables a user to search for interactive environments supported by the system. For example, user interfaces may be provided via which the user may provide search criteria, such as location (e.g., within a certain range of the user's current determined location, within a certain range of a specified zip code, within a certain range of a specified city, at specified venue-types (e.g., museums, sports venues, concert venues, etc.), what interactive environments the user's friends are engaging with, live interactive environments, historical (no longer live) interactive environments, interactive environments scheduled for a future date or date range, etc. The search engine may provide recommendations to the user or rank search results based on the user's profile, current date, current time, and/or the user's current location. The search engine may return search results via a search results user interface for display on a device (e.g., a user device), ordered in accordance with the closeness of the match. The user may select an interactive environment identified in the search results, and the user may then view (e.g., preview) and, where applicable, participate in the selected interactive environment.

Figure 11A:
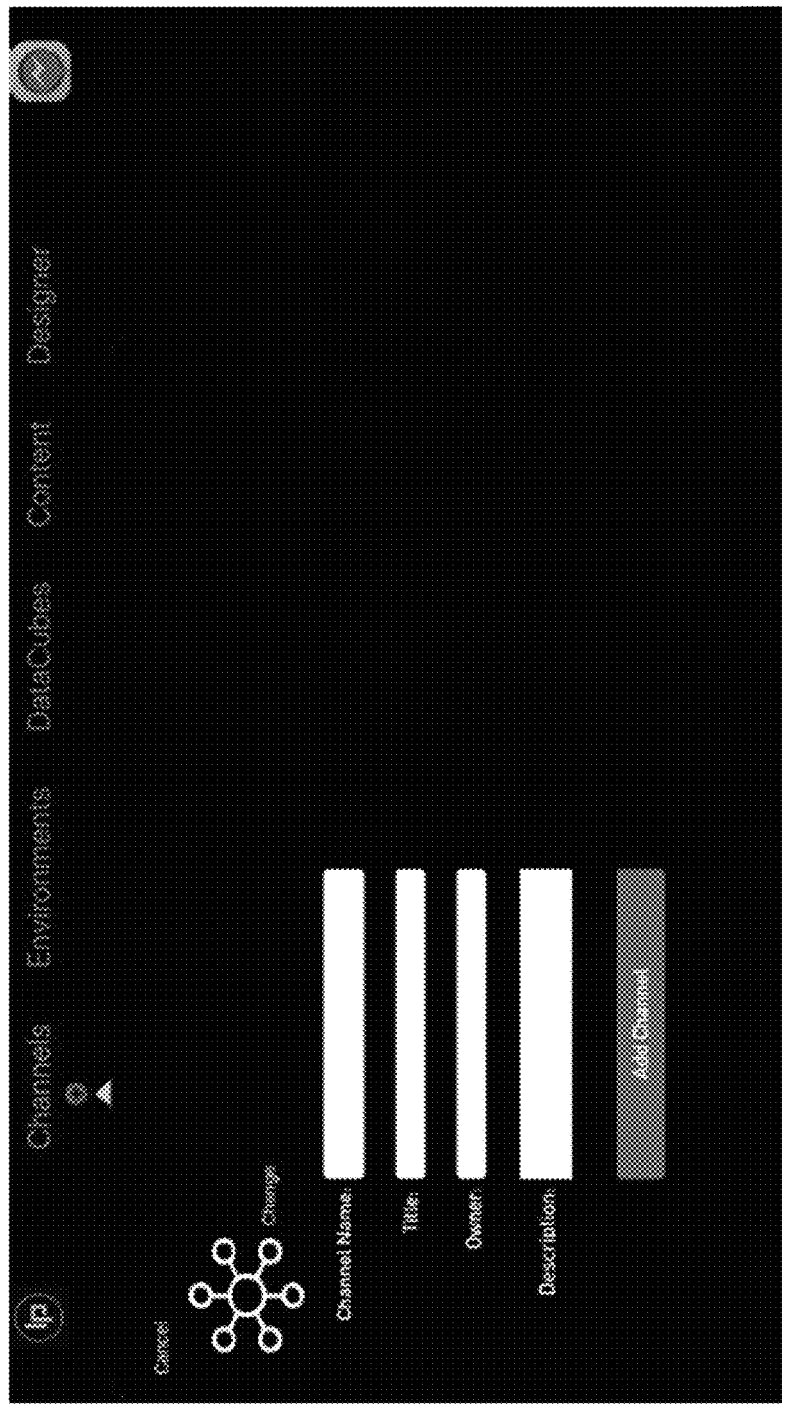
FIG. 11A-11L illustrate example user interfaces.
Figure 11B:
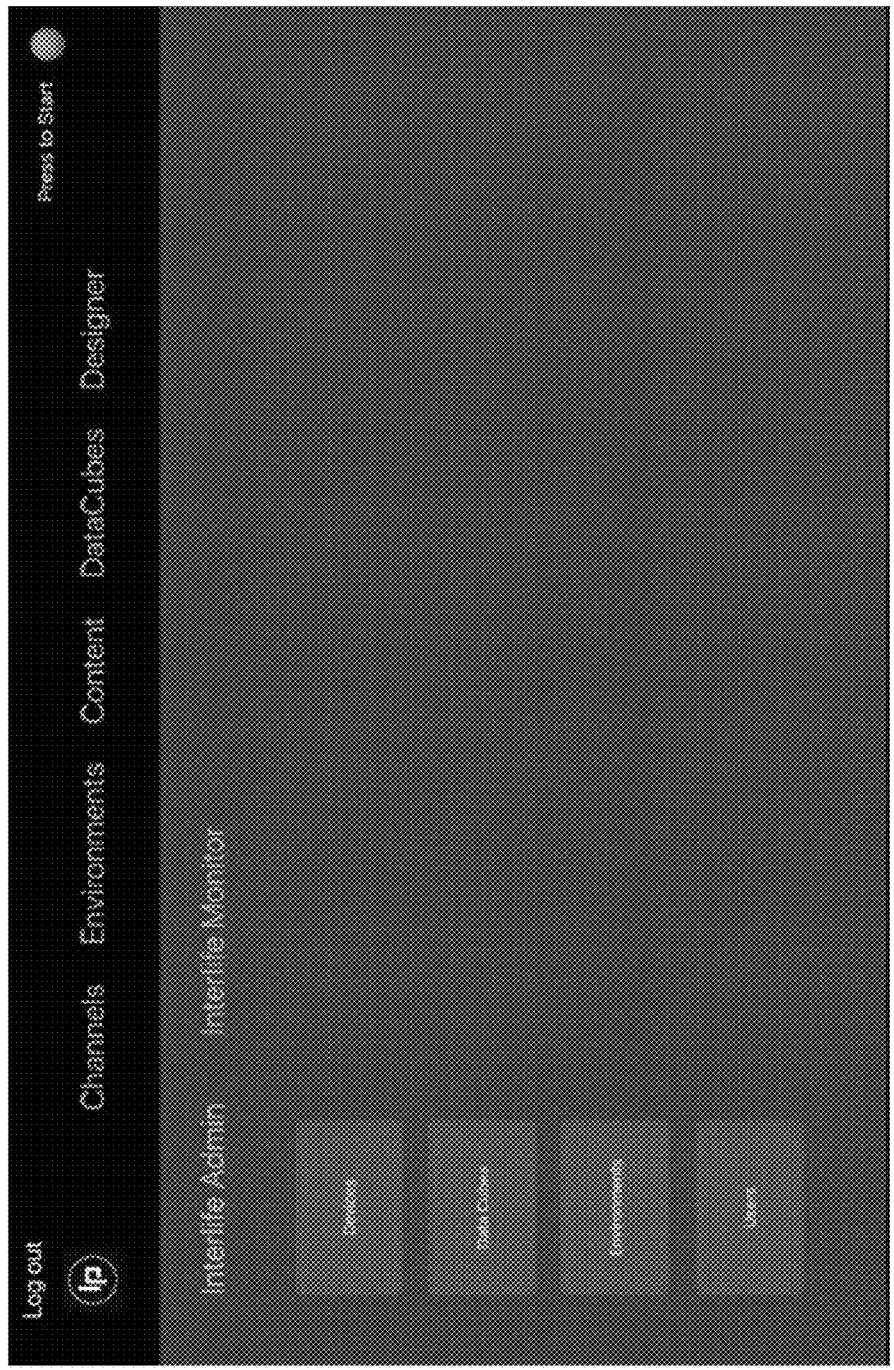
Figure 11C:
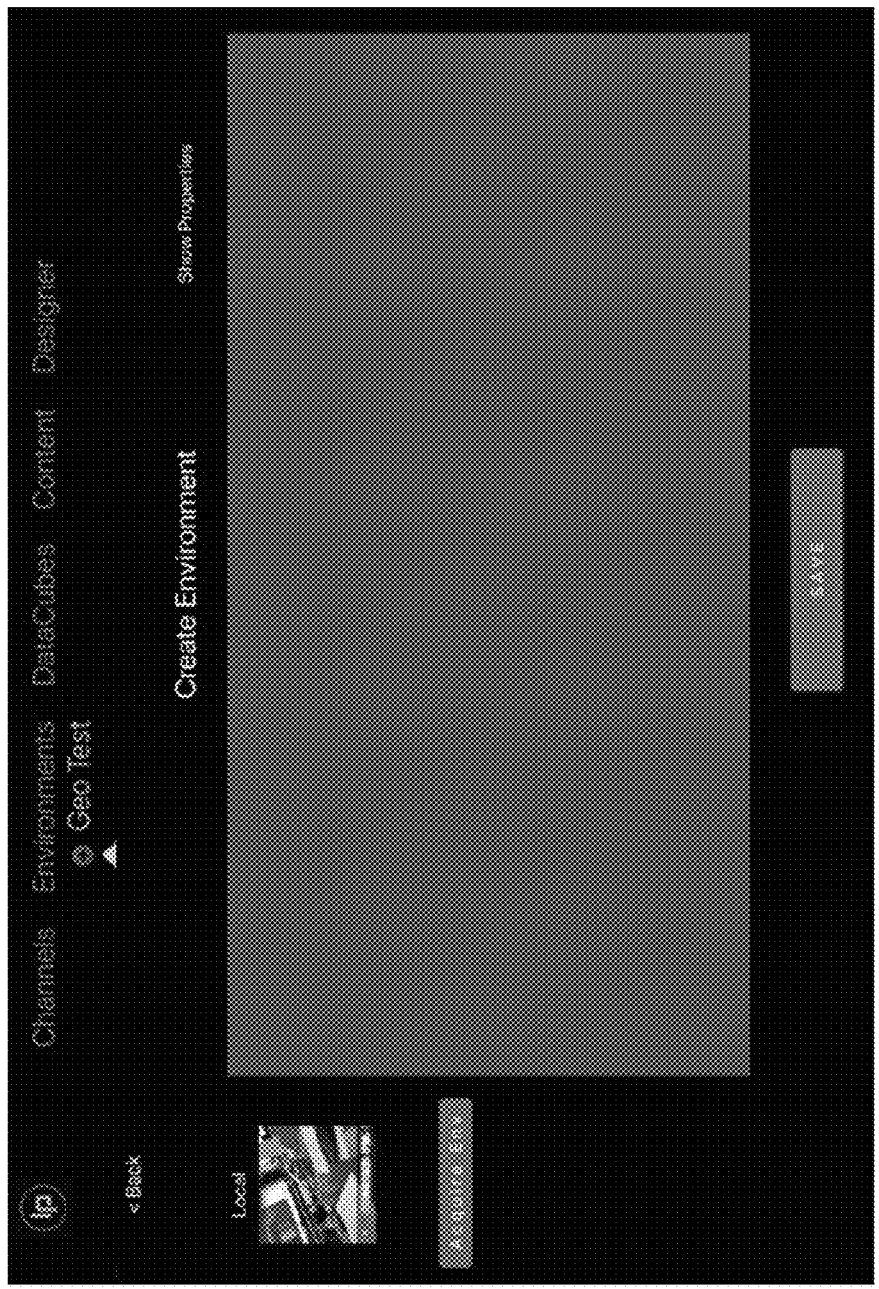
Figure 11D:
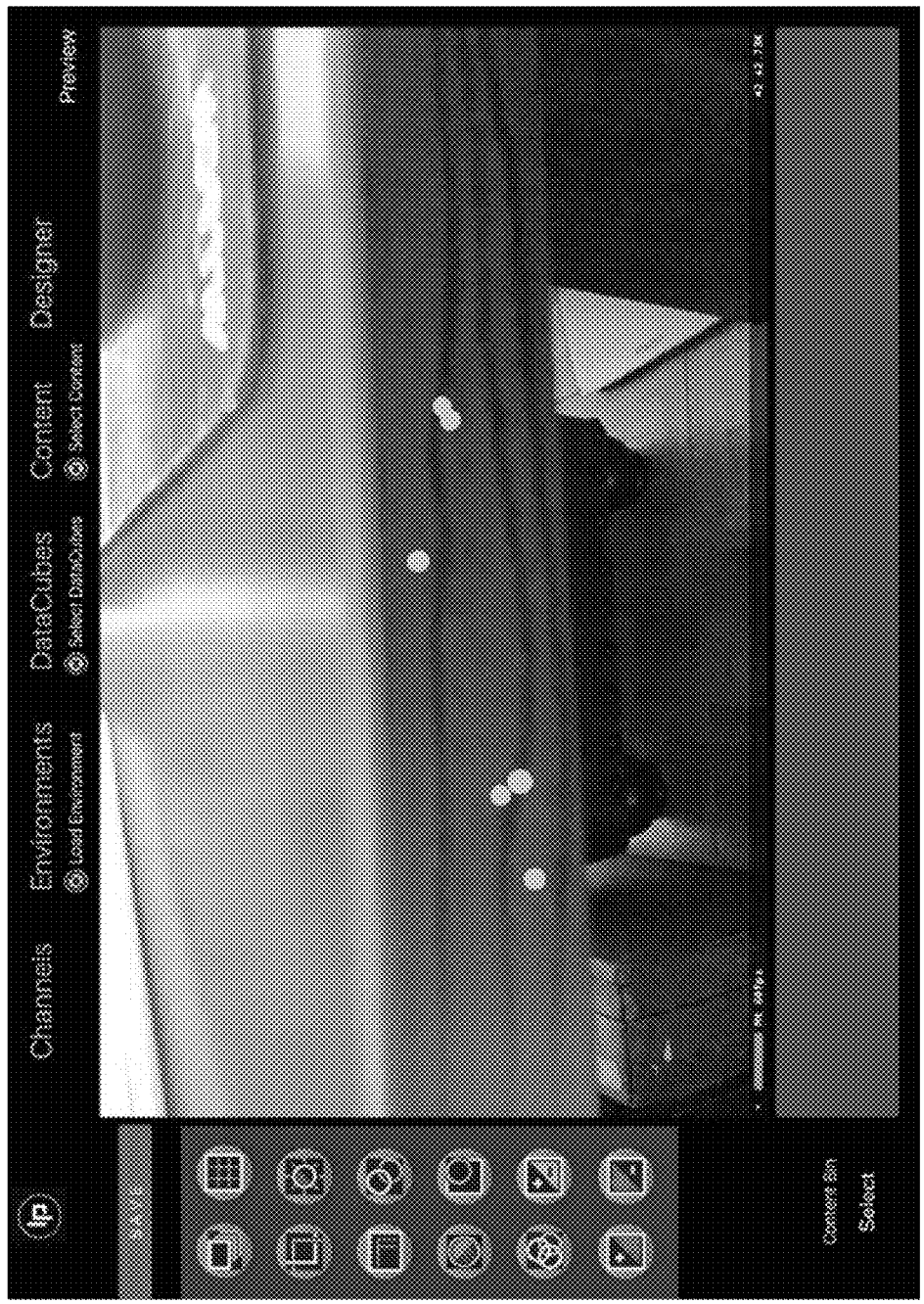
Figure 11E:
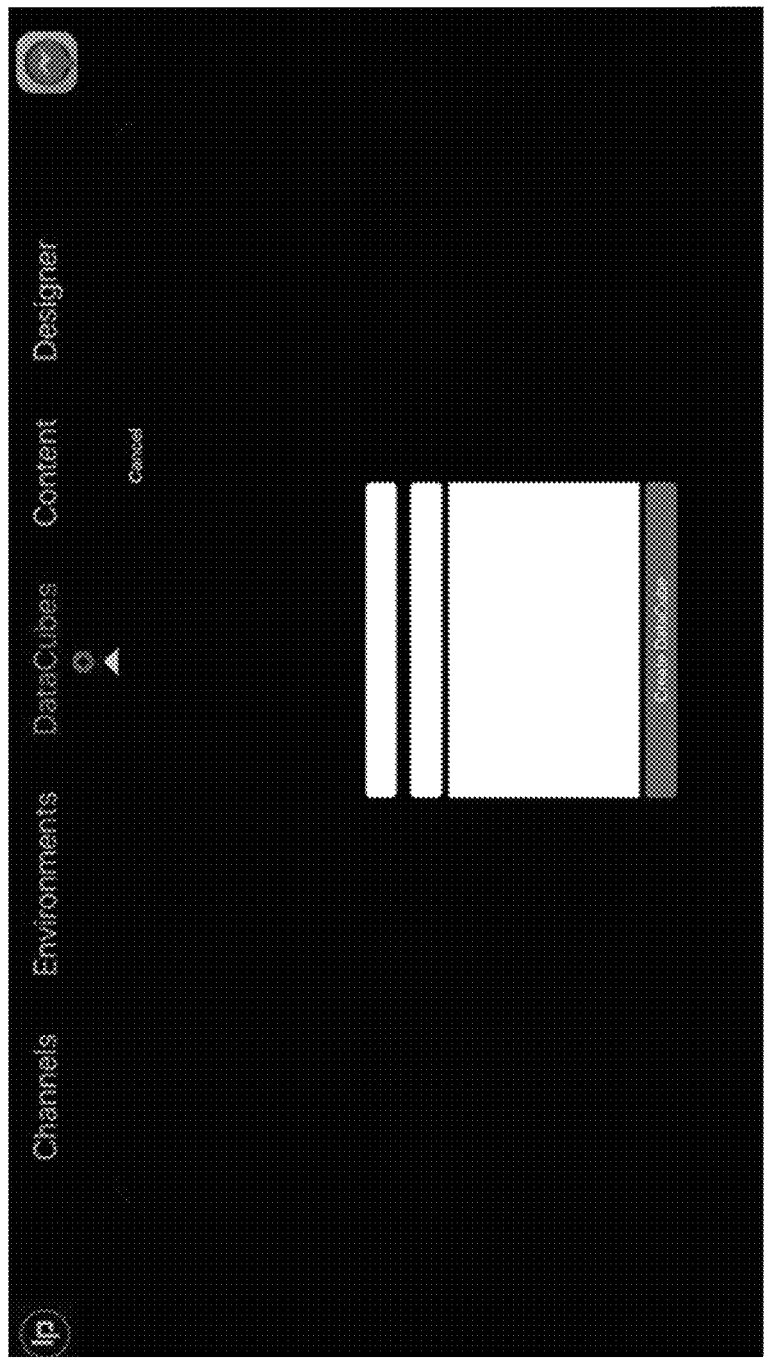
Figure 11F:
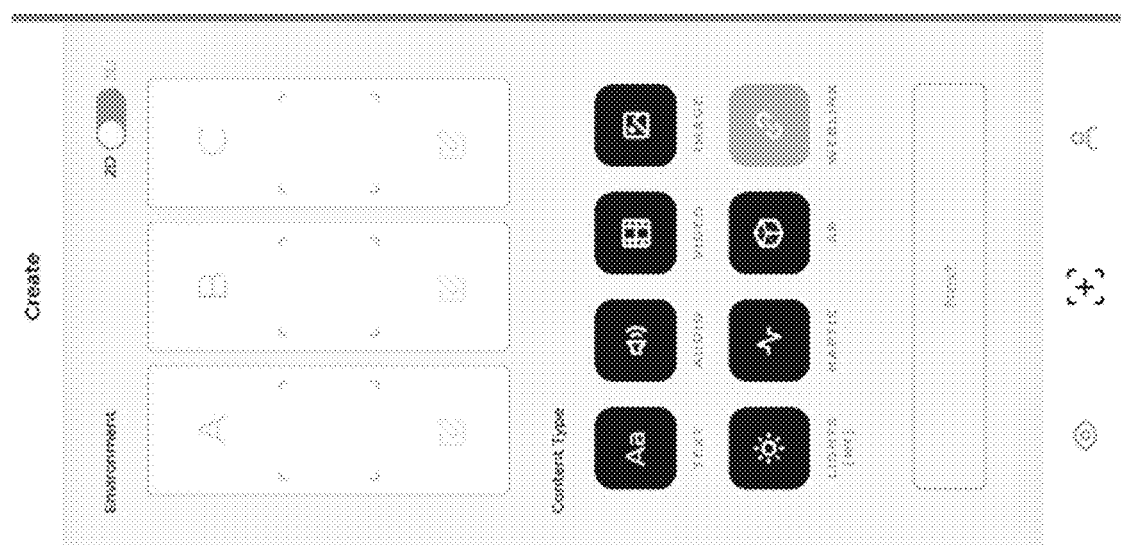
Figure 11G:
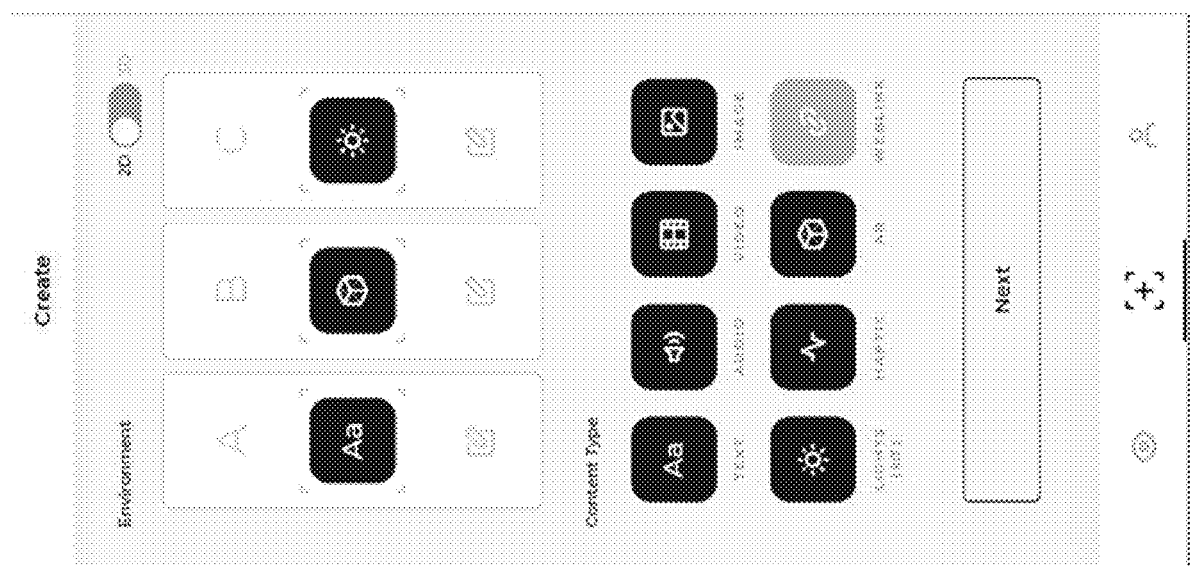
Figure 11H:
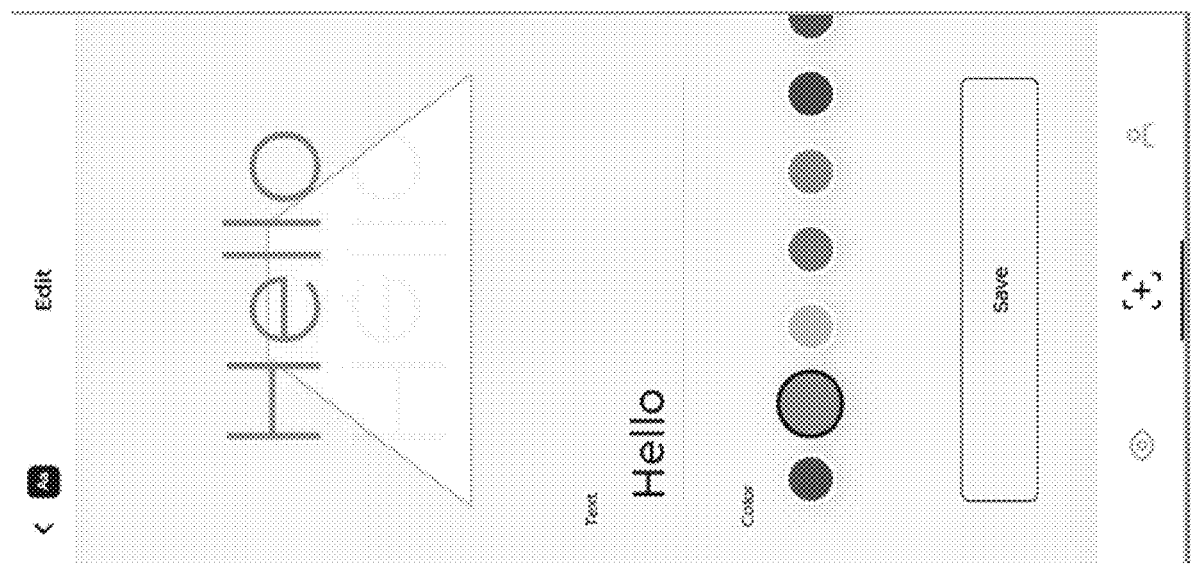
Figure 11I:
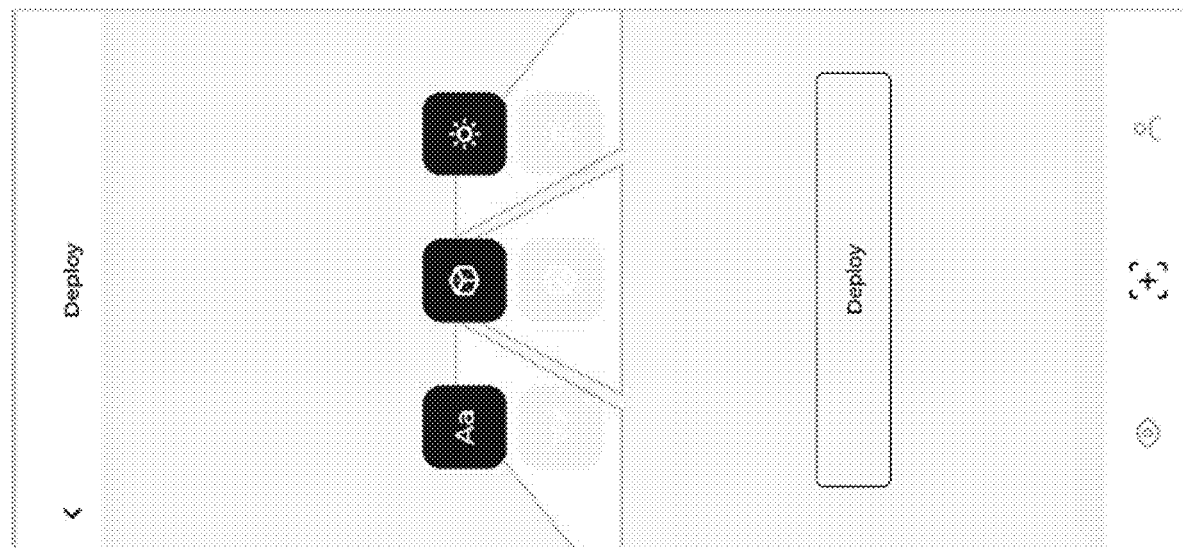
Figure 11J:
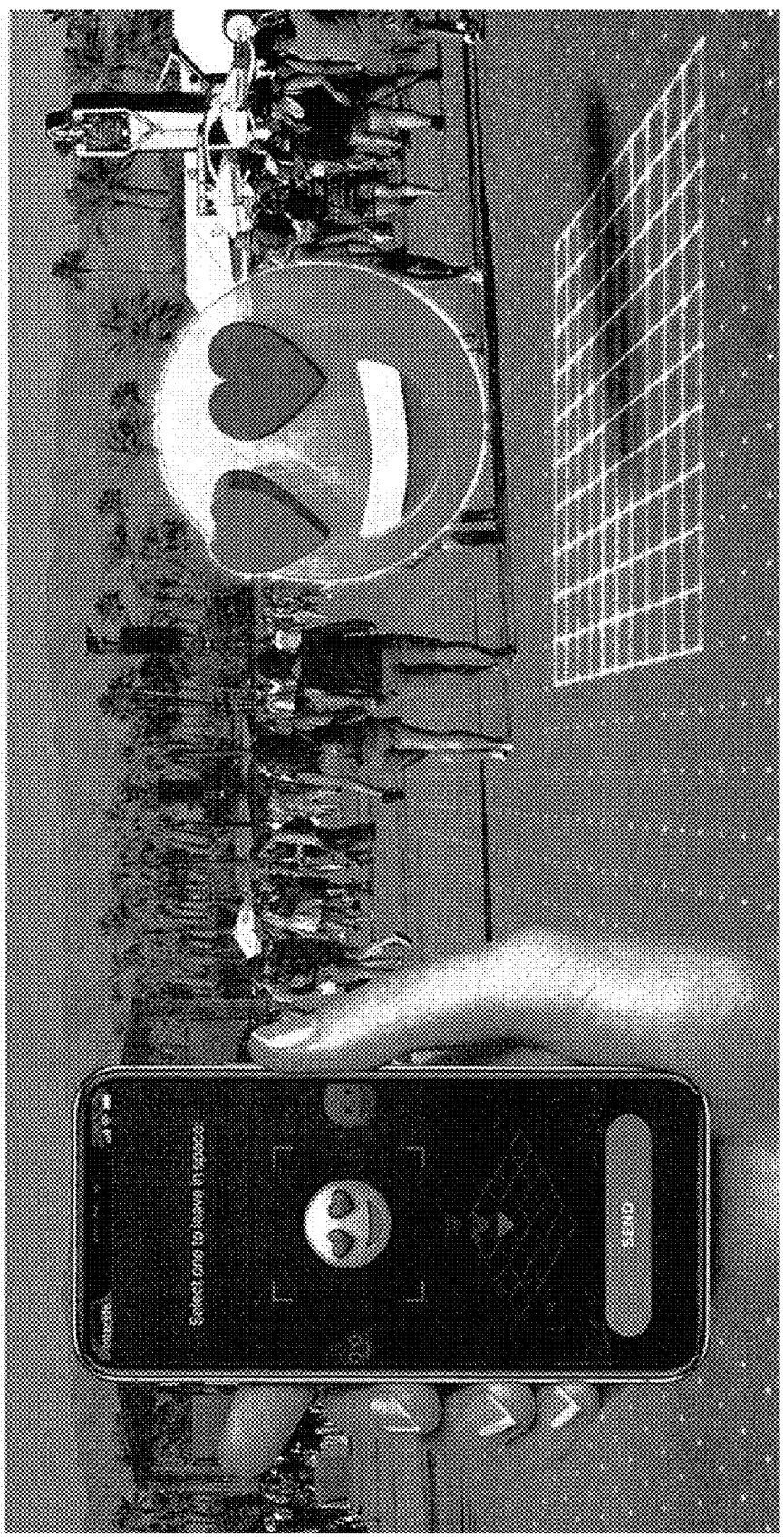
Figure 11K:
Figure 11L:

Optionally, a map interface, such as illustrated in FIG. 11L, may be generated and rendered on a user device showing the locations of interactive virtual environments (e.g., within a certain range of the user's current location and at a location (e.g., city, zip code, landmark) specified by the user (e.g., selected by the user from search results) and showing the user's current location. The map may indicate (e.g., in response to a user touching or hovering over an interactive environment indicator displayed by the map) an interactive environment type (e.g., game, educational data, messages, currency gifts, etc.), and/or associated interactive environment rules/participation requirements (e.g., any associated participation costs, data sharing, etc.). The map may provide navigation instructions in the form of turn-by-turn directions and/or via an illustrated path that provides one or more paths from the user's current location to a selected interactive virtual environment.

Figure 1C:
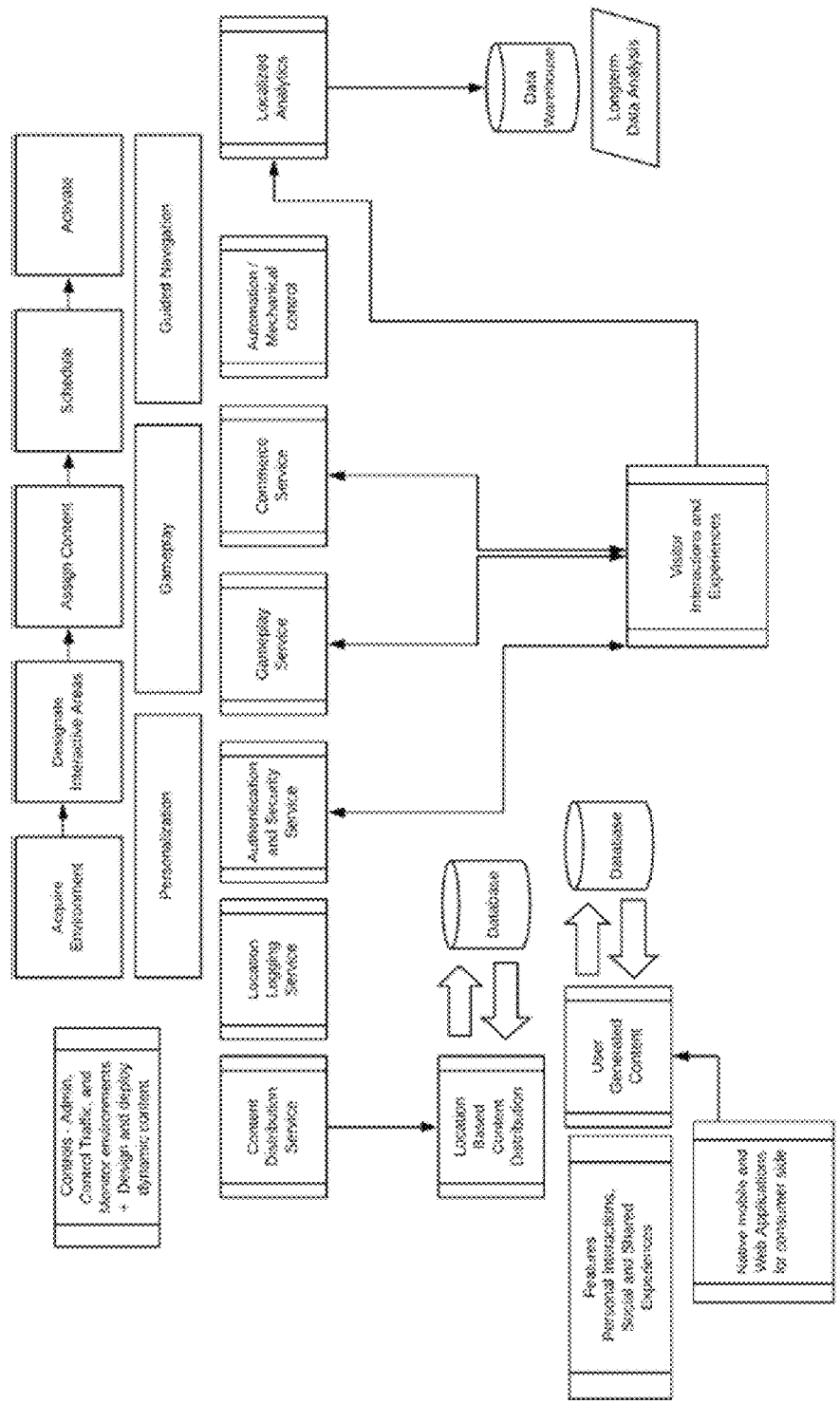
FIG. 1C illustrates example system components.

FIG. 1C illustrates system 104 components in greater detail. A control component is provided that enables a user to perform administrative functions and control traffic. For example, the control component may control the flow of user and/or vehicular traffic at certain locations by autonomously and dynamically distributing content, commands (e.g., control of street lights, locking and unlocking of doors, etc.), actions, and/or programs among appropriate cells associated with the corresponding geo-location based on user/object movement and interactions with the interactive environment. In addition, the control component m may monitor environments, and design and deploy dynamic content in an interactive, virtual environment. The example system enables a physical environment to be captured and modeled, enables interactive areas to be defined for the physical environment (e.g., using an addressable mesh), assign content to areas, schedule when content is to be shown and/or actions to be taken, and activate the designed interactive environment.

Optionally, the system 104 may perform resource allocation of computer resources, network bandwidth resources, and memory resources based at least in part in real time streaming user/object tracking and interaction data or on predications of user movements and predictions of the density of users at a given location. For example, network bandwidth resources may be allocated by the spatial operating system to display devices at different locations based on the number of potential content consumers at those different location.

By way of further example, computer resources, network bandwidth resources, and/or memory resources may be prioritized and allocated to certain applications being utilized by users where interaction delays are more user-perceptible (e.g., virtual games) as compared to lower priority applications, such as the non-interactive display of an item of video content.

Components are provided that enable an interactive environment to be personalized for a given user (e.g., based on user content and other preferences explicitly provided by the user via a profile user interface and/or inferred from a user's selection and/or interaction with content), that provides gameplay, and/or that provides guided navigation from a user's current location to a destination location (e.g., a destination location specified by the user, by a game, by other interactive program, or otherwise).

For example, a user profile for a given user stored by the system may include a user real name, user online name (e.g., an alias), user languages, current location, residential location, age, gender, other demographics, favorite games, favorite genres of games (e.g., shooter, role playing, military, driving, survival, survival/horror, rhythm/musical, graphic adventures, text adventures, vehicle simulation, life simulation, construction simulation, sports (e.g., baseball, basketball, football, soccer, hockey, etc.), fighting, etc.), favorite gaming console, favorite genres of movies/shows (e.g., comedy, drama, romantic comedies, horror, science fiction, fantasy, police procedurals, etc.), favorite actors, favorite celebrities, favorite sports teams, and/or favorite physical locations.

A user profile may include privacy preferences. For example, a user may specify that the user does or does not want her actual identify shared with other participants in interactive environments, does or does not want her gender identity, age, or other demographic information shared with other participants in interactive environments or with advertisers, does or does not want her movements stored or used except as needed to participate in interactive environments, does or does not want her movements stored or used at all, does or does not want to be tracked during certain days and/or times of days, does or does not want the identify of the content viewed by the user revealed to advertisers, and/or the like.

A content distribution service module provides location-based content distribution (e.g., using content stored in a database) as described elsewhere herein. A social interaction component enables personal interactions, as well as social and shared experiences. Mobile and web applications may enable user-generated content to be created and saved in a database for later use (e.g., location-based content distribution).

A location logging service detects and logs the location of users and/or objects (e.g., as detected using tracking techniques described herein), optionally in association with a respective timestamp and a respective tag and/or identifier.

A visitor interaction module provides interfaces for visitor (e.g., end users) interactions and experiences. The visitor interaction module may utilize an authentication and security service module to authenticate users and provide access to system services when users are appropriately authenticated.

The visitor interaction module may utilize a gameplay service module to provide visitors with an interactive, computer-based gaming experience. The visitor interaction module may utilize a commerce service module to provide visitors with the ability to receive or provide payments, to purchase items, to purchase the right to engage in selected interactive environment experiences, the ability to access certain content, and/or the like.

The visitor interaction module may communicate visitor actions (e.g., locations, movements, content viewing, gameplay interaction, commerce transactions, and/or the like) to an analytics module, which may in turn generate localized or short term analytics (e.g., real time analytics based on streaming data (e.g., tracking data, content consumption/interaction data, etc.) or analytics over a relatively short time period, such as 1 hour, 12 hours, 1 day, 1 week, 2 weeks, 1 month), such as the example analytics described herein, which may be stored in a data warehouse. A long term analysis component may provide analytics over a longer period of time (e.g., 1-2 months, 6 months, 1 year, etc.).

Optionally, at least a portion of the data used for long term analysis may be stored in relatively slower, less expensive access memory (as compared to the relatively faster, more power intensive memory used to temporarily store real time streaming data) to reduce energy consumption, size, and/or costs.

An automation/mechanical control component may be utilized to control robots, UAV, and other motor/servo controlled objects (e.g., optionally based on a user actions in an interactive environment).

Figure 1D:
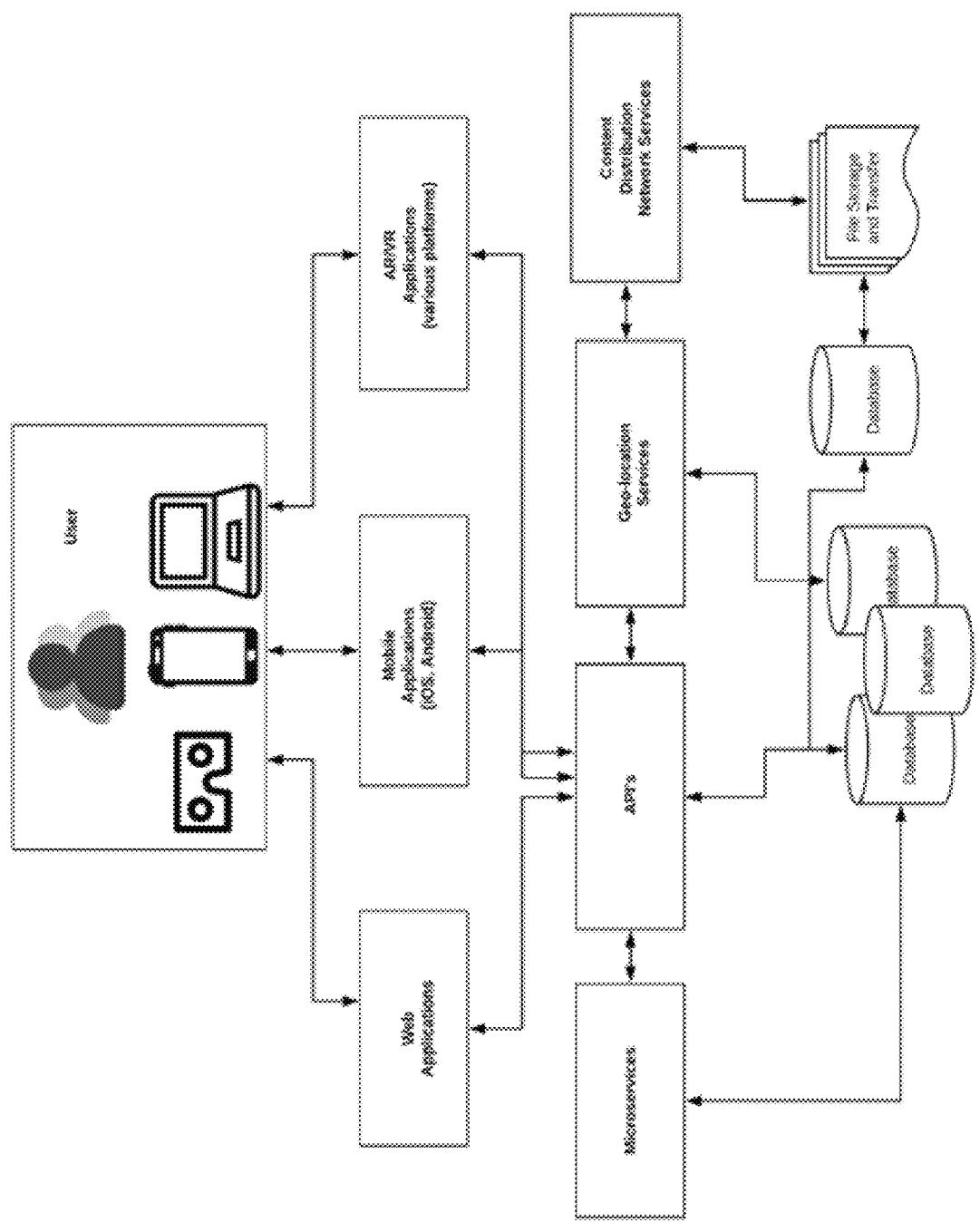
FIG. 1D illustrates an example software container diagram.

FIG. 1D illustrates an example software container diagram. Web applications, mobile applications (e.g., which may be hosted on an device utilizing IOS, ANDROID, or other operating service), augmented reality (AR) or virtual reality platforms, or other applications may be used to provide the various services and functionalities described herein to end users.

One or more APIs may provide such user device applications access to platform microservices, geo-location services, and content distribution network services (such as those described herein). APIs may be provided to provide third party applications access to the system to receive user location data, provide content, etc. The platform microservices, APIs, and geo-location services may access and/or store content, actions, programs, rules, and/or the like. A file storage and transfer component may enable the content distribution network services to access and/or store content in a database.

Figure 1E:
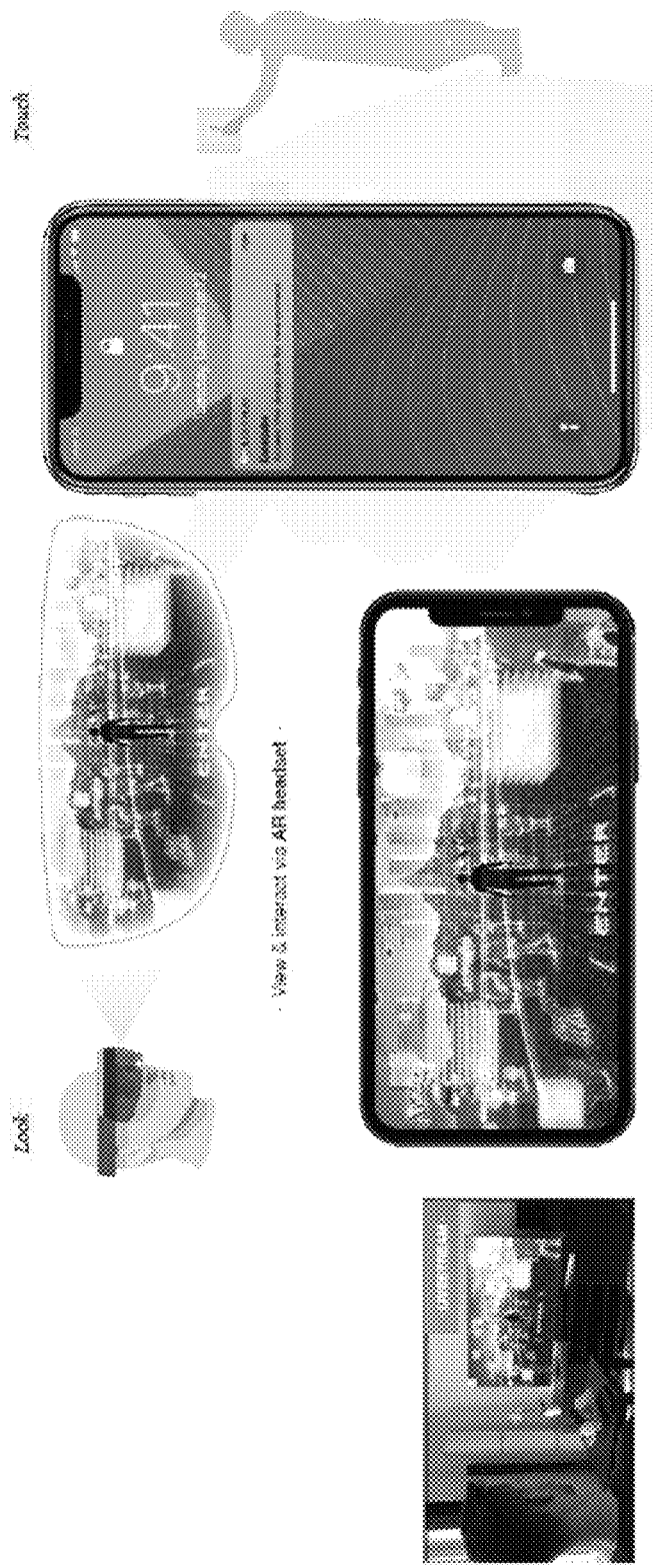
FIG. 1E illustrates example rendering devices.

FIG. 1E illustrates various example devices (e.g., a smart TV, AR headset, phone), via which users may view and interact with content, applications, and commands as described herein to provide 3D geo-spatial based content experiences. The devices may be located at a physical, real-world environment for which location-based data cubes have been assigned, or may be remote from the physical, real-world environment. Where the device is remote from the physical, real-world environment, cameras located at the physical, real-world environment may be used to stream real-time live images to the device, overlaid with associated augmented reality content.

Figure 1F:
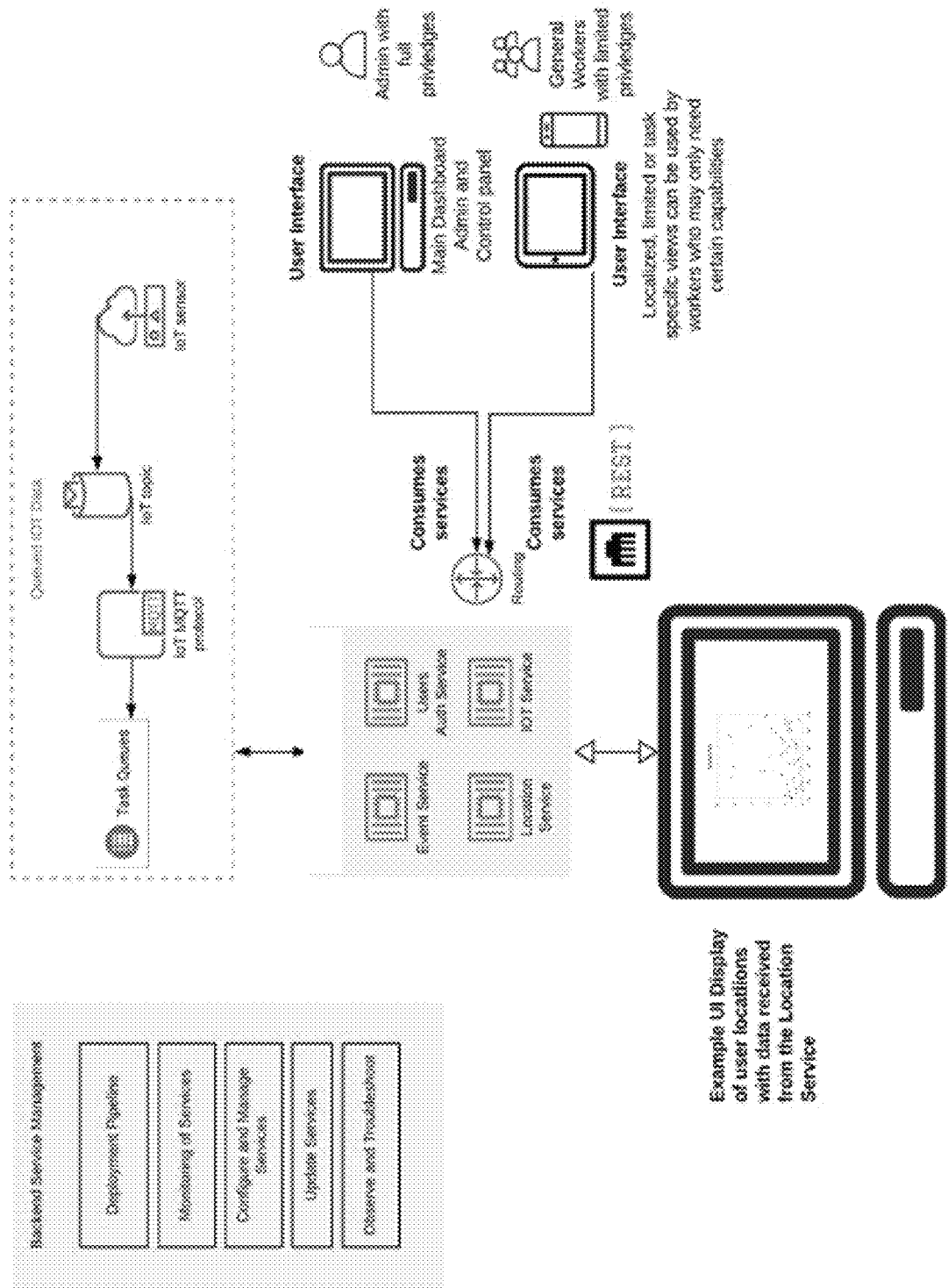
FIG. 1F illustrates an example IoT architecture.

FIG. 1F illustrates an example implementation where the system described herein communicates with Internet of Things (IoT) devices. Backend service management components provide a deployment pipeline (where content may be first cached, then preprocessed, and then rendered or pre-rendered), monitoring of services, service configuration and management (which may provide automated/scripted administrative resources and user interfaces capabilities that can be configured differently for different environments and different for different use cases), service updates, and monitoring and troubleshooting services.

Sensor data from IoT devices may be streamed to the system (e.g., to task queues), optionally using a lightweight publish/subscribe a machine-to-machine messaging transport (e.g., the MQTT (Message Queue Telemetry Transport) connectivity protocol). Optionally, a system for automating deployment, scaling, and management of containerized applications (e.g., a cluster of services, such as event services, user authentication services, location services, IoT services (provides commands and tracks IoT devices), etc.) may be provided. The task queues enable tasks to performed by the containerized applications asynchronously (e.g., in the background) outside of a corresponding request.

Control and reporting user interfaces (e.g., dashboard, administrator, and/or control panel user interfaces) may be provided to terminal, such as to administrator terminals. An example user interface may display user locations in an environment (e.g., as reported via tracking techniques described herein), optionally in association with various related data, such as user identification data, user interaction data, content being viewed data, commerce transactions, performed, etc. Access to certain data and tasks may only be granted to those that have an appropriate level of authorization. Certain, higher level administrators, may be provided with full access to data and tasks.

Figure 2:
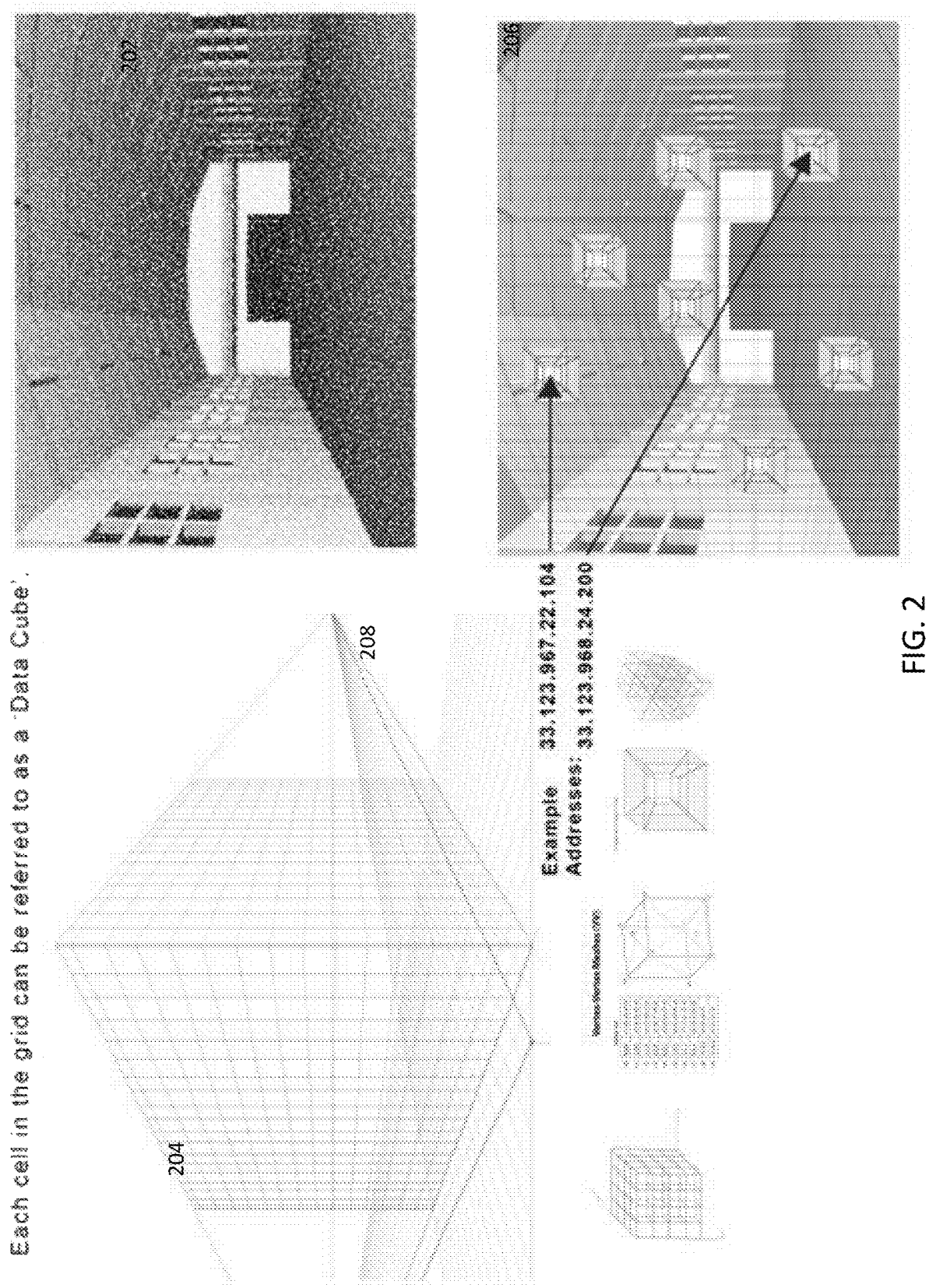
FIG. 2 illustrates an example physical, spatial environment and an associated mesh.

FIG. 2 illustrates an example three dimensional spatial, physical environment 202 associated with a 3D mesh 204. An interface 206 may present the three dimensional spatial environment 202 overlaid by the 3D mesh 204. Cells may be assigned addresses 208 to thereby form cells (which may be data cubes) in a logical grid. Optionally, a given address may identify a corresponding physical location (e.g., X, Y, Z coordinates in a three dimensional coordinate system associated with a vertex of the mesh cell, where the X, Y, and Z coordinates can be relative to a tracking/position or other sensor, or can be absolute in space). Optionally, each vertex or point of intersection of vertices in the mesh may be assigned a corresponding address. Data cubes that have programs, content, triggers, actions or action associated therewith may be visually emphasized (e.g., rendered to appear as 3D shapes rather than 2D shapes, bolded, highlighted in color, and/or the like) and optionally identified (e.g., by name and/or description). In addition, addresses associated with a given cell may be displayed. Physical dimension information may be accessed from memory and presented in association with a given mesh, meta-container, and/or mesh cell. For example, the physical dimension information may be distance information relative to a wall, floor, and/or ceiling, relative to an antenna and/or a relative to a virtual reference point.

As similarly discussed above, the mesh may include, by way of non-limiting example, a grid of cubes of one or more sizes, a grid of cuboids of one or more sizes, a mesh of spheres of one or more sizes, a mesh of cylinders of one or more sizes, a mesh of cones of one or more sizes, a mesh of triangular prisms of one or more sizes, a mess of prisms with hexagonal bases of one or more sizes, a mesh of pyramids of one or more sizes, other polyhedral, or any combination thereof. A user interface may optionally be provided that enables the size and shape of each cell or of a set of cells to be modified. Optionally, one or more menus may be provided that enables a cell shape and/or size of a given cell or set of cells to be selected from a predefined set of cell shapes or sizes. Optionally, the cell size may be dynamically modified based on a current use case. For example, a smaller cell (e.g., 7×7×7 cm) may be used for interactive games, and a relatively larger cell (e.g., 15×14×14 cm) may be used when the use case is the playing of recorded or live video content.

Figure 3:
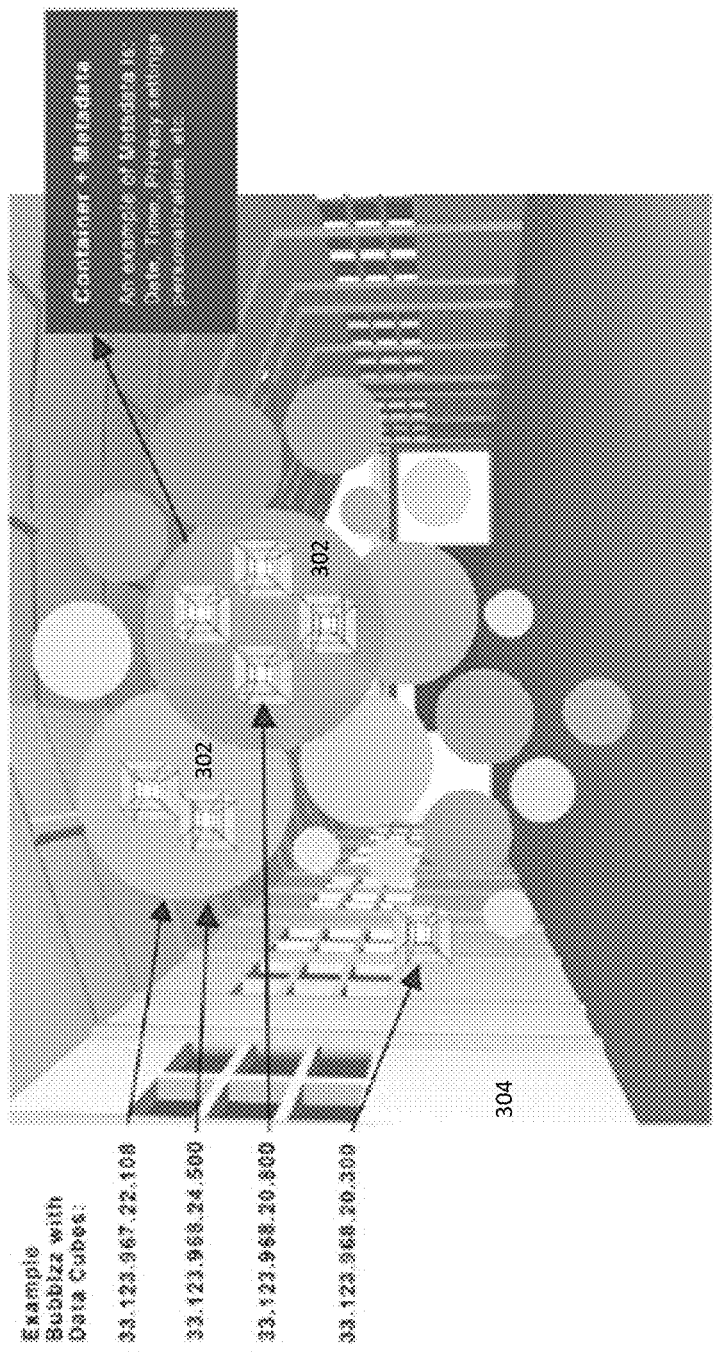
FIG. 3 illustrates an example physical, spatial environment, an associated mesh, and meta-containers.

Referring to FIG. 3, containers 302 of mesh cells in a physical space (e.g., a building) 304 are illustrated. The containers 302 act as a mechanism for associating cells together and/or with metadata. A container may be grouping of digital and/or physical objects. A container may contain one or more other containers (which in turn may contain one or more cells/data cubes), to associate the contained containers with each other. One or more data cubes and/or cell containers can participate in the sending and receiving of data, and can act in combination as a 'swarm' or participate in 'mesh' computing activity. For example, if the data cube corresponds to an unmanned vehicle (e.g., an unmanned aerial vehicle or other drone), the unmanned vehicles may be operated as a coordinated whole based or real time tracking data or other activity data to accomplish a desired goal. Optionally, direct two-way communication may be provided between multiple data points, such as multiple cells and/or containers.

A container may be associated with metadata, programs and other types of higher order data. A container may be dynamically or statically assigned a grid address.

Commands can be sent to the cells, and the cells may transmit back data, including the cell position and/or address. A given cell or container may be dynamically moved and positioned using physical or programmatic controls as similarly discussed elsewhere herein.

Figure 6:
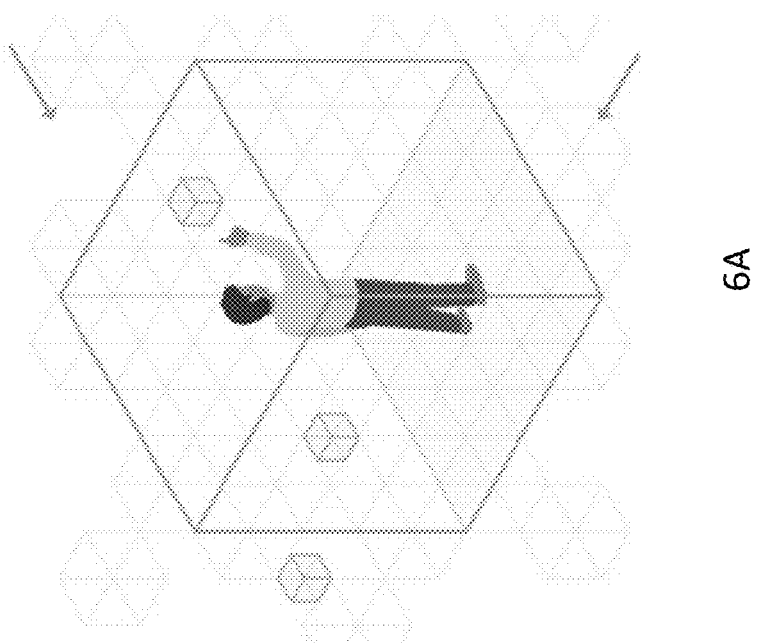
FIG. 6 (6A, 6B) illustrates active interaction with an example interactive environment.
Figure 6:
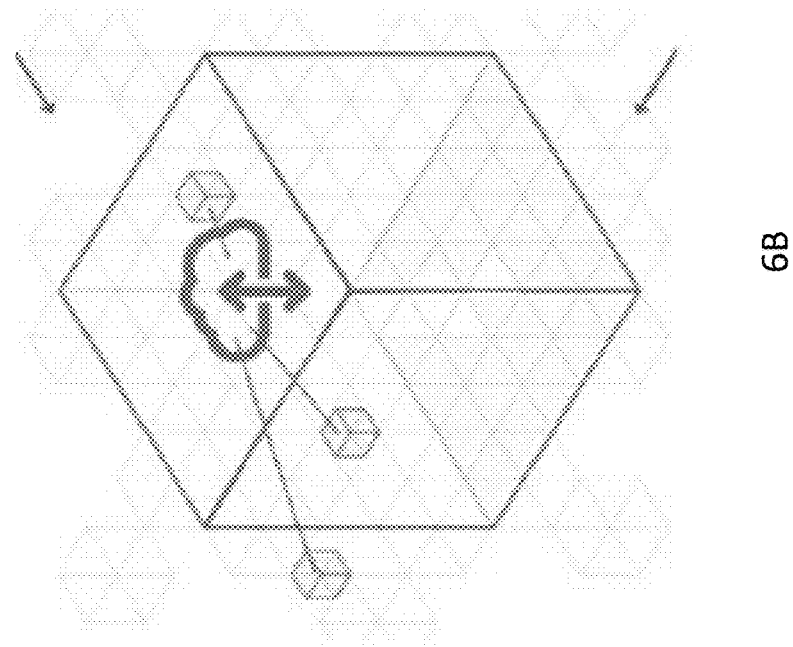

FIG. 6A illustrates a person actively interacting with an interactive environment. In this example, the person is pointing at a location in space that is associated the a mesh cell having an address associated with one or more programs. When the system detects (e.g., using techniques described elsewhere herein) that the person is pointing at a given cell (e.g., using a finger or camera equipped device, such as a phone), the system determines whether a program is associated with the cell address and if the person pointing at the cell is a program trigger, the system may execute the program accordingly.

FIG. 6B illustrates a machine, bot, or programmatic entity, actively interacting with the tracking system to trigger a program (or programs) associated the a mesh cell having an address associated with one or more programs.

Figure 7B:
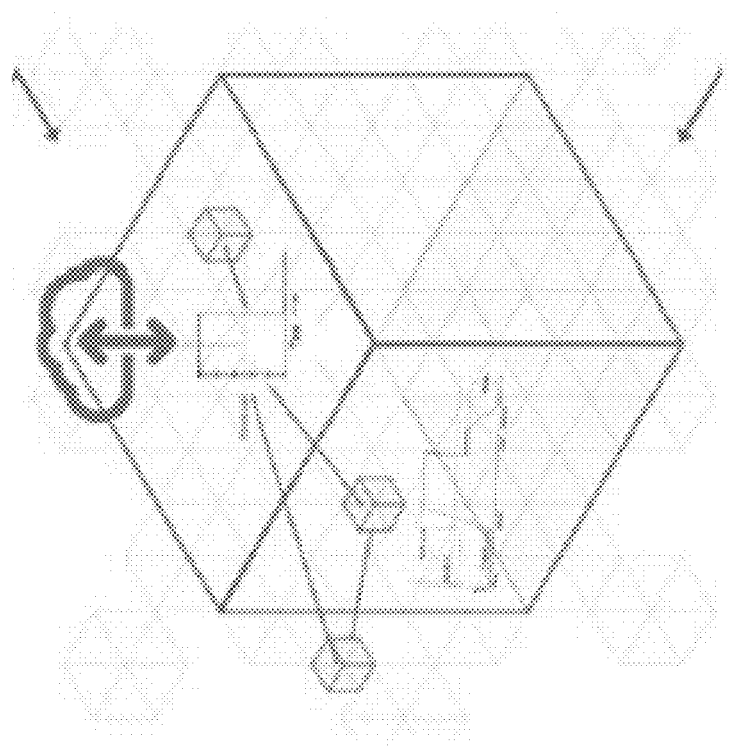
FIG. 7 (7A, 7B) illustrates passive interaction with an example interactive environment.
Figure 7A:
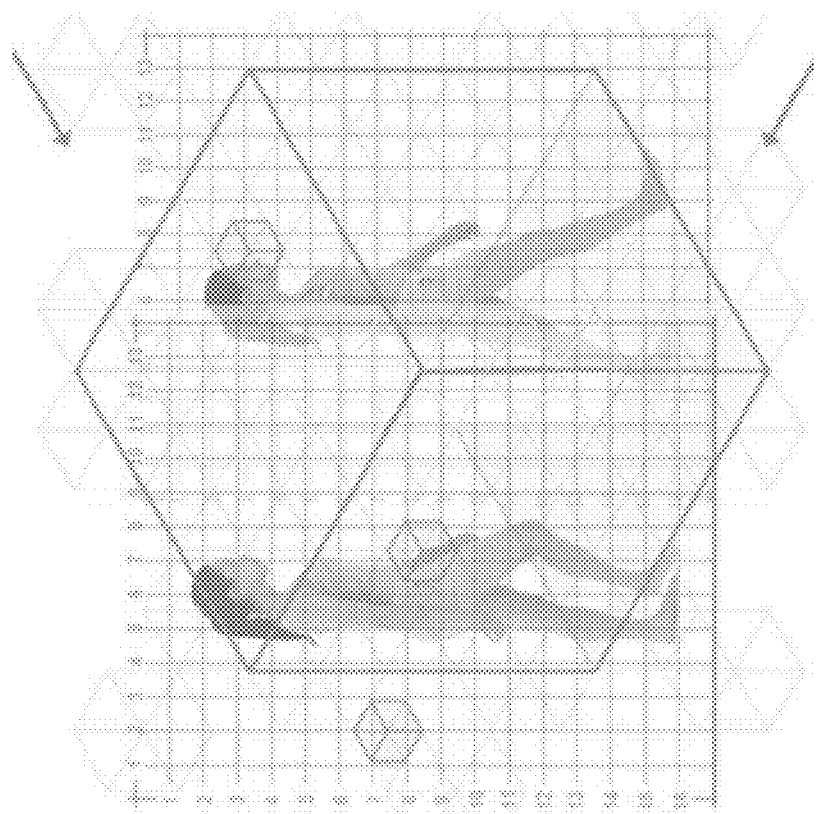

FIG. 7A illustrates a person passively interacting with an interactive environment. In this example, the person is walking through a container including one or more cells that is associated with an address associated with one or more programs. When the system detects (e.g., using techniques described elsewhere herein) that the person is walking through the container, the system determines whether a program (or program) is associated with the address associated with the container, and if the person walking through the container is a program trigger, the system may execute the program accordingly.

FIG. 7B illustrates a machine, bot, or programmatic entity, actively (intentionally) interacting with the tracking system to trigger a program (or programs) associated the a mesh cell having an address associated with one or more programs. For example, a program or programs associated with a given location (e.g., associated with a cell or container address) may become active based in response to certain thresholds (which may be specified via a corresponding user interface) being met. A given activated program may optionally trigger other programs to run, pause, or stop.

Figure 8:
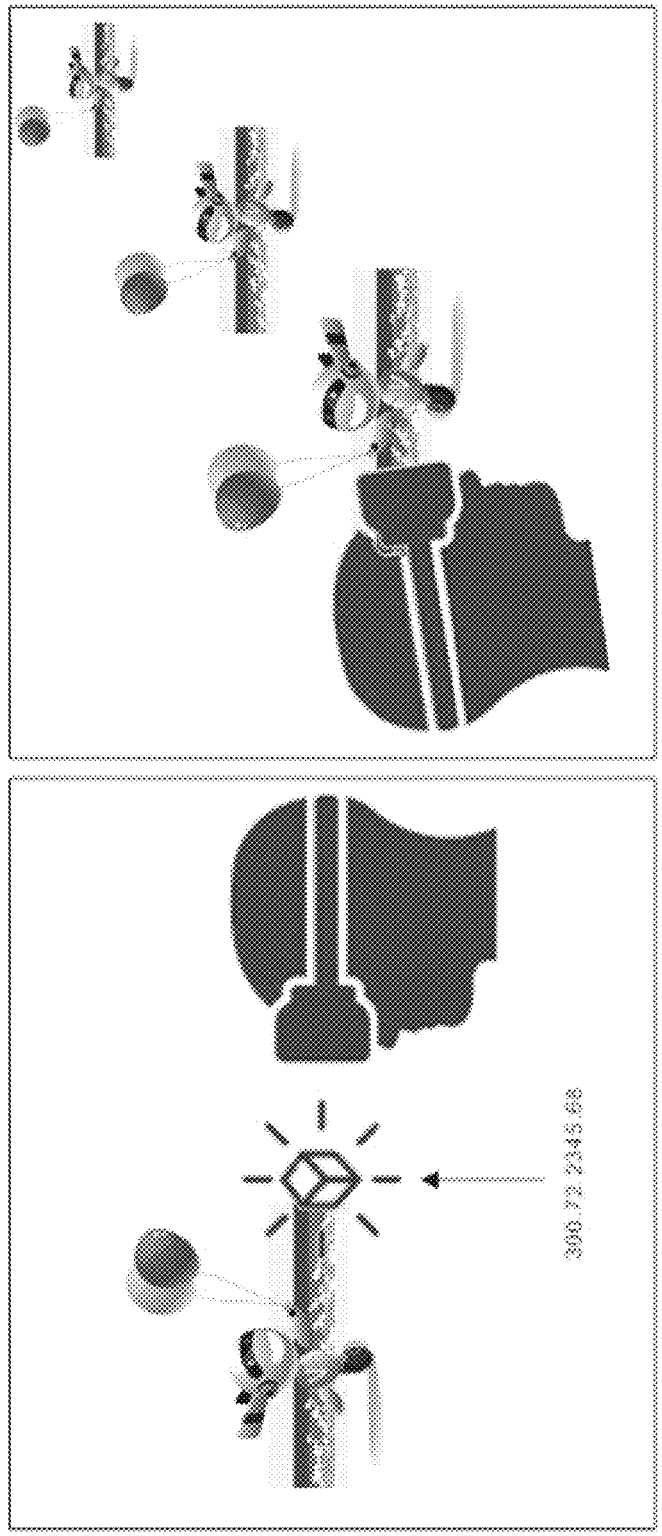
FIG. 8 illustrates an example of a person viewing augmented reality content.

FIG. 8 illustrates an example of a user viewing augmented reality content using an augmented reality headset (e.g., a headset that provides a simulated visual environment through physical display optic lenses or projectors, allowing the user to see both a digital, computer generated display (e.g., of text, images, graphics, colors, etc.) and the world through the glasses). In this example, the user is viewing, in 3D, content associated with a data cube (optionally overlaying a view of a physical environment that is viewed via headset lenses). The data cube is associated with a location in physical space that corresponds to a mesh cell address. In this example, as the user moves her head and/or eyes away for the data cube location (so that the user is not looking directly at the data cube location), the content is partially or completely hidden from their field of view, and as the user moves closer or further away from the data cube, the content associated with the data cube scales up or down in size accordingly.

Optionally, the user's head movement may be tracked using head tracking devices included in the headset or using other techniques described herein. Eye tracking may be performed by shining a light (e.g., a near infrared light from a light emitting device included in the headset) onto the user's eye and using a camera included in the headset to record the direction the light is reflected from the cornea. The position of the eye, and the direction of eye focus, may then be determined.

Figure 9A:
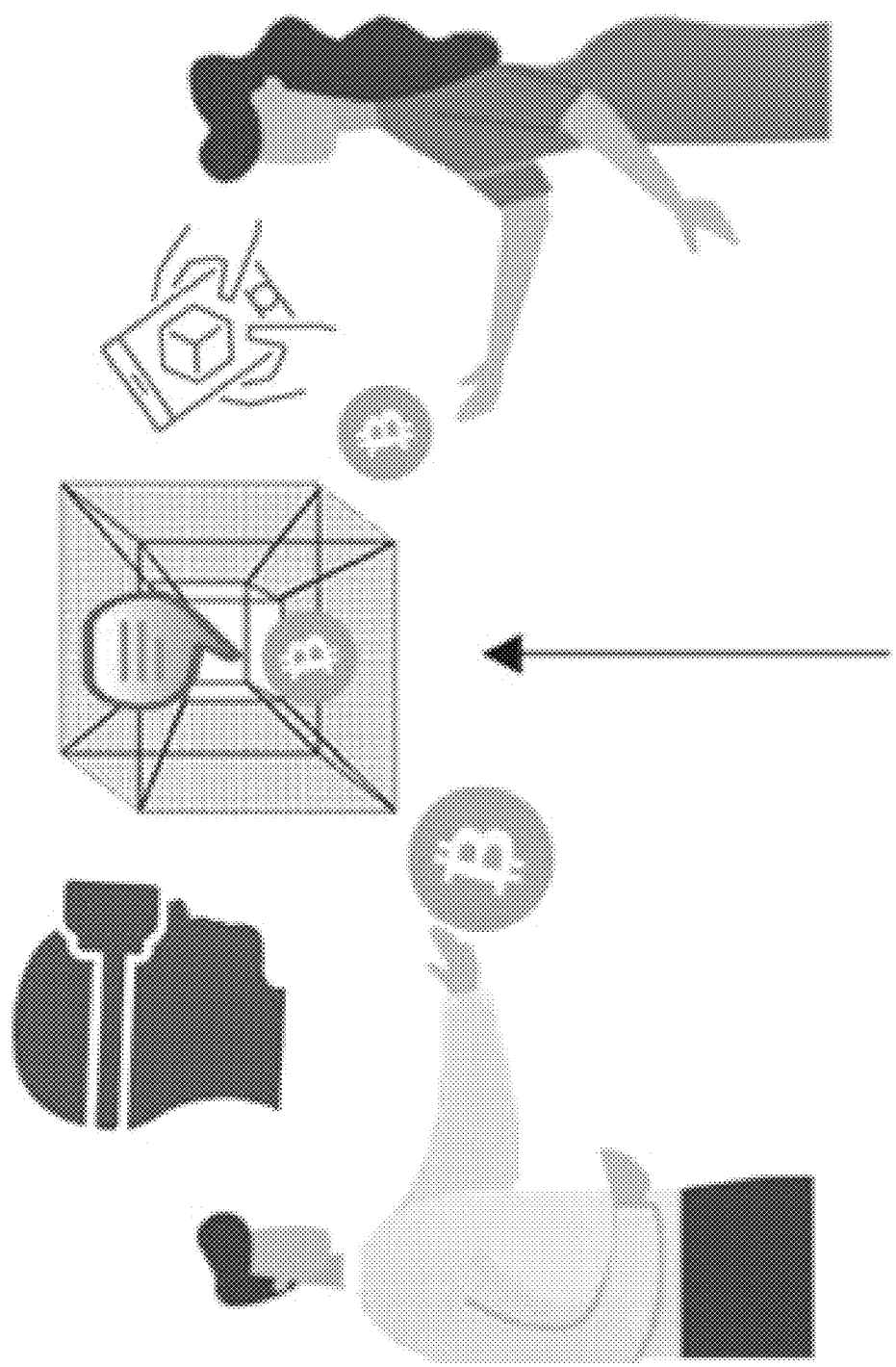
FIG. 9A depicts an example of messaging via a mesh cell.

FIG. 9A depicts messaging and currency transfer via a mesh cell. In the illustrated example, a user is leaving a message and a recipient is receiving at message at a three-dimensional physical location associated with a mesh cell address. For example, the user leaving a message may point to or stand in the physical location or may point to a representation of the physical location as displayed on a user or other device to indicate where the message is to be left. In addition, the user leaving the message may identify a particular recipient or set of recipients (e.g., selectable from a contact list provided via an app), or may indicate that the message is to be provided to anyone who passively and/or actively accesses the location and optionally who have agreed to receive such message. The user may, via an interface, record the message via voice, text, by selecting or providing an image, or otherwise.

The system may receive the identification of the selected location, the designation of recipients, and the message. When the system detects a designated recipient passively and/or actively interacting with the corresponding physical location (e.g., by walking through or pointing at the location), the message may then be transmitted to the recipient device (or other device in proximity of the recipient) for reproduction (e.g., display and/or audio playback) and/or for local storage for later reproduction.

FIG. 11J illustrates an example user interface presented on a user device (a mobile phone in this example) via which the user can select an animated emoji (e.g., a 2D or 3D emoji) from a library of emojis and specify a physical location (via a mesh cell associated with the physical location) at which the emoji is to be "left" for later access by one or more designated recipients. The user may be located at or remote from the physical location when leaving the message.

With respect to currency transfer via a mesh cell, in the illustrated example of FIG. 9A, a user is associating a currency amount (e.g., a virtual, digital currency, such as a crypto currency) and a recipient is receiving a transfer of the currency amount at a three-dimensional physical location associated with a mesh cell address. For example, the user leaving the currency amount may point to or stand in the physical location or may point to a representation of the physical location as displayed on a user or other device to indicate where the currency amount is to be left. In addition, the user leaving the currency amount may identify a particular recipient or set of recipients, or may indicate that the currency amount is to be provided to anyone (or to the first number of people, such as the first 20 people) who passively and/or actively access the location and optionally who have agreed to receive such currency transfers. The user may specify from which account the currency is to be transferred and the amount of the transfer via a corresponding user interface.

The system may receive the identification of the selected location, the designation of recipients, and the specified currency amount. When the system detects a designated recipient passively and/or actively interacting with the corresponding physical location (e.g., by walking through or pointing at the location), the currency amount may then be transmitted to the recipient device or a recipient account. A transfer notification, indicating the source of the transfer and/or the amount of the transfer, may be transmitted to and presented by the recipient's device.

Figure 9B:
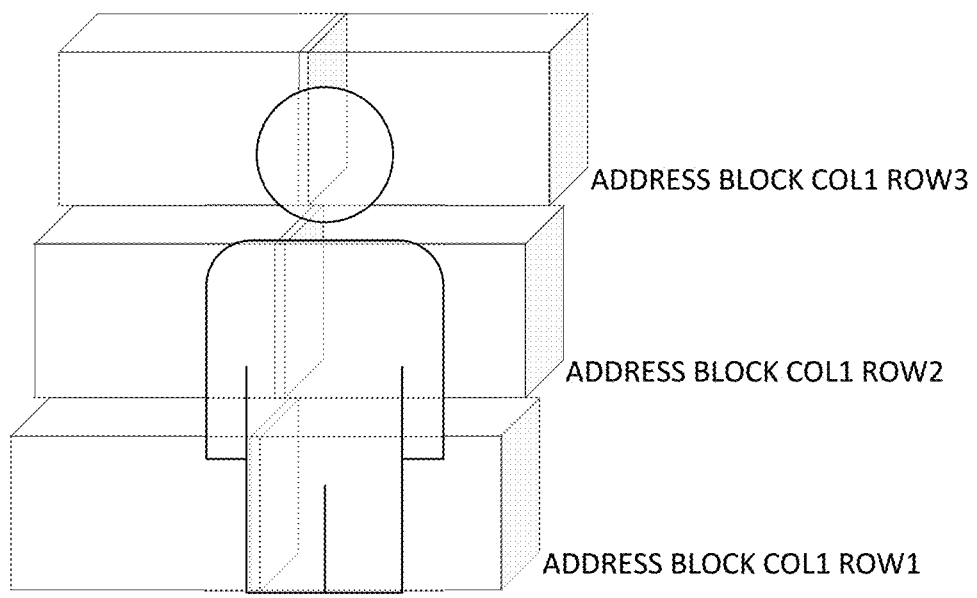
FIG. 9B illustrates an example of a person having different body portions in various mesh cells.

FIG. 9B illustrates a person in an interactive environment virtually partitioned into mesh cells, with different body portions in different mesh cells. The system may use the position of the body portions (e.g., as determined using imaging or other tracking data) to determine where to place content (e.g., based on the determined eye level of the user) or what action to take (e.g., based on the user's hand position in a given cell or hand movement through multiple cells). The cells may be associated with addresses which may be used to locate corresponding content, actions, triggers, commands, programs, and/or the like.

Figure 10:
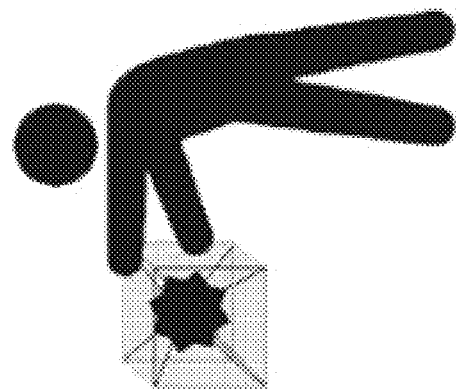
FIG. 10 illustrates utilization of an avatar to interact with an interactive environment.
Figure 10:
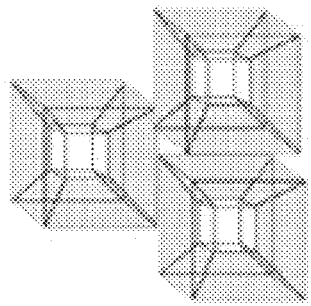
Figure 10:
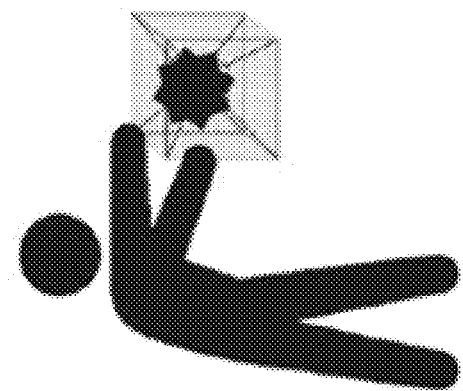

FIG. 10 illustrates a user utilizing a user-controlled avatar to provide a virtual presence within an interactive, partitioned environment. In the illustrated example, avatars interact with elements (e.g., data cubes that may include content, commands, actions, applications, etc.) in the environment, thus enabling the users controlling the avatars to remotely interact with elements in the environment. Such use of avatars enables users to participate in location based games, to create, discover, share, place, and/or move content or data cubes within the interactive environment. A user may be enabled to control multiple avatars in a game or other interactive experience. An avatar may configured to appear on the user device (e.g., AR or VR headset) as a life size figure. A user may be enabled to control avatars, move data cubes, interact with content via a hand gestures (which may be in the form of finger or whole hand gestures), touch screen, mouse, touch pad, pen, voice input device, game controller, keyboard, eye tracking mechanism, and/or otherwise.

FIG. 11K illustrates an example interface with avatars (in association with corresponding player aliases and real user images) of game players overlaying an image of a physical space (and real people, structures, and objects in the physical space) that provides an environment for the game. The image of the physical space may be a real time image streamed from one or more cameras at the physical space.

Certain example processes will now be described with reference to the figures.

Figure 4:
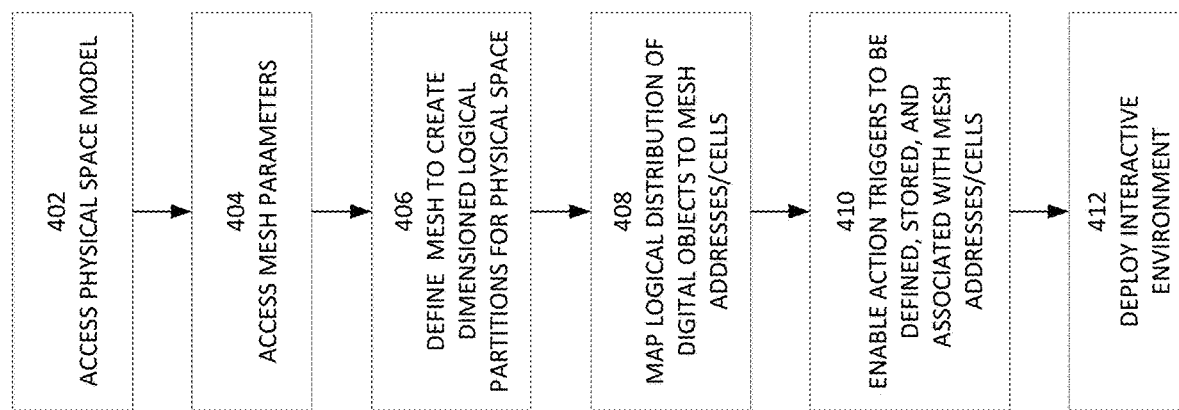
FIG. 4 illustrates a flowchart for an example interactive environment definition process.

Referring to FIG. 4, an example interactive environment definition process is illustrated. At block 402, a model of a physical space is accessed. For example, a menu of models of physical spaces (e.g., the interior of a convention center, a concert venue, a stadium, a museum, a factory, a school, an office building, a home, a theme park, a mall, etc.) may be presented to a user via a user interface displayed on a user device. The user may select a desired model.

Optionally, a point cloud may be generated of a 3D physical space (e.g., from architectural drawings, using a laser scanner, using radio waves, and/or other using other mapping techniques). As similarly discussed above, the data points may be converted to an array of adjacent values that optionally can be used to define logical addresses. Optionally, such a logical address can be combined with high precision GPS notation for latitude and longitude. Optionally, one or more cells may not be assigned a logical address. Optionally, an address assigned to a given mesh cell may provide a relationship to a tracking sensor at the physical space.

When mapping a mesh to a physical space, one or more rules may be accessed and a determination may be made as to whether any mapping of a mesh cell to a physical location would violate a rule. For example, a determination may be made whether the mapping of a cell for receiving content would conflict with a physical object (e.g., a planter, a kiosk, etc.) at the physical location, and would hence be a location where content should not be associated. Such conflicts may be determined via machine learning configured to identify or tag objects and/or via manual tagging of objects.

At block 404, mesh parameters may be defined or accessed. For example, the mesh cell geometry (e.g., the cell shapes, such as cuboid, spherical, cone, cylindrical, etc.) and/or size (e.g., height, width, length, diameter, altitude, slant height, based diameter, etc.) may be accessed from memory or defined via a user interface.

At block 406, the physical space model and mesh parameters may be used to define a mesh for and associate the mesh with the physical space. For example, the mesh may be used to create logical partitions of the physical space using the mesh cells, where a given mesh vertex may be associated with a 3D address.

At block 408, a user interface and/or application programming interface (API) may be provided via which objects (e.g., digital images, audio, static content, real time streaming content, mapping content, computer generated animated content, virtual reality content, augmented reality content, etc.), actions, programs, etc.) are mapped to cells (and corresponding cell addresses). Example actions may include starting, stopping, pausing, and/or running a program, as well as the display of content.

At block 410, a user interface or API is provided via which automated event triggers or live events triggers may be defined for actions associated with a given cell. For example, a trigger may be detecting a user (e.g., any user, a specific user, or a user in a specified set of users) entering from a first side, entering from a second side, present in (e.g., for a specified period of time), and/or leaving an area comprising one or more cells during one or more specified time periods (e.g., 8 AM-10 PM Monday-Friday, and 10 AM-6 PM Sunday and Saturday). One or more thresholds may be specified that cause certain actions to be launched when such threshold is satisfied (e.g., a certain number of people or objects passing through one or more cells, a certain temperature being reached, a button being pushed a threshold number of times, etc.). Such trigger and threshold definitions may be stored in association with the mesh cell addresses.

At block 412, an interactive environment comprising the defined mesh, mapped objects, and triggers may be deployed so that it may be interacted with at the corresponding physical space.

Figure 5:
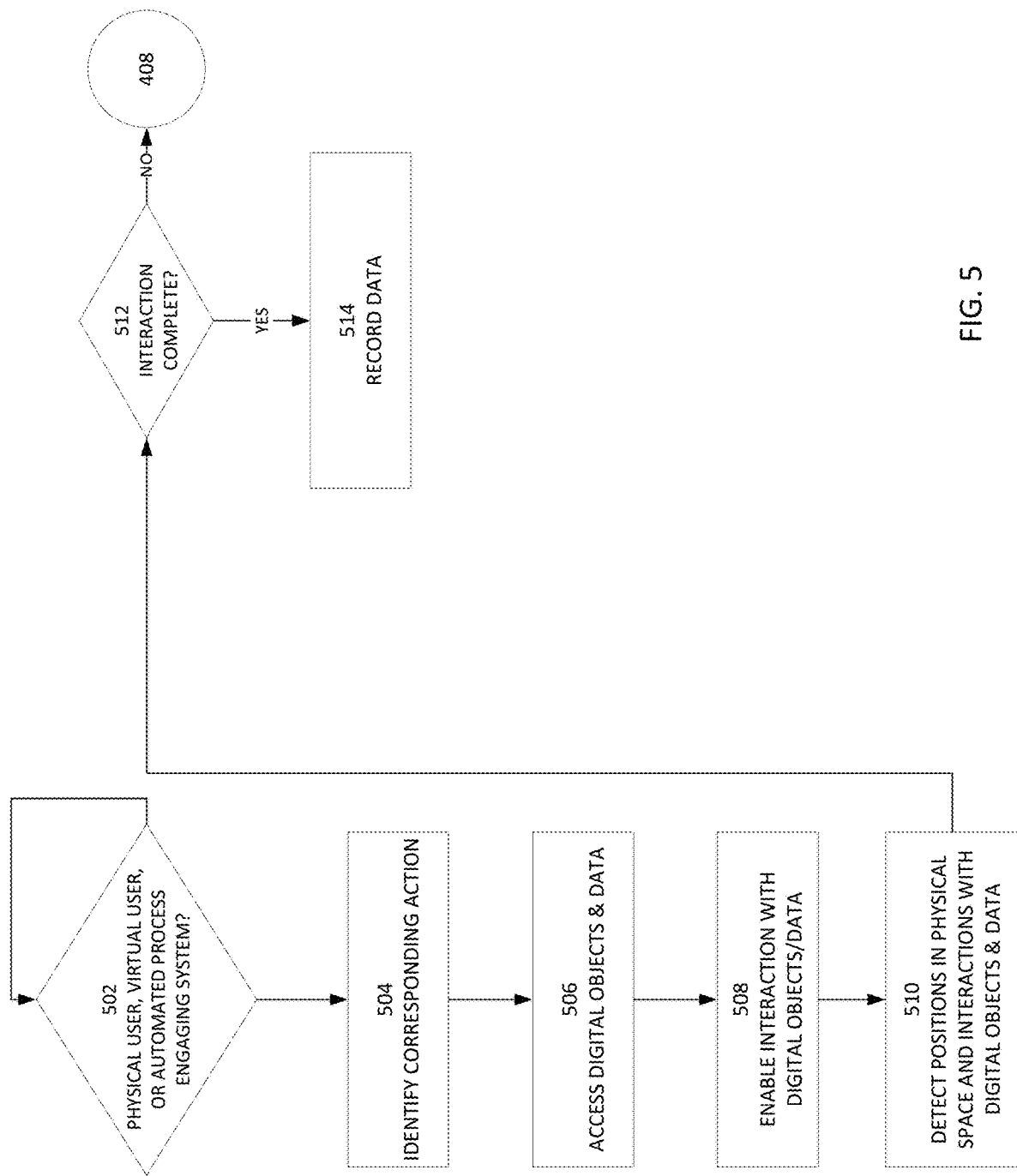
FIG. 5 illustrates an example interactive environment operation process.

FIG. 5 illustrates an example interactive environment operation process. At block 502, the process detects if a user or automated process is engaging with the system via an interactive environment (such as that defined via the example process illustrated in FIG. 4). For example, the process may detect a user interacting with (e.g., by entering, leaving, pointing at, etc.) one or more cells associated with an action that is mapped to a physical space, where the cells may be associated with corresponding addresses.

At block 504, one or more actions associated with the cell address(es) may be identified and accessed from memory. For example, an action may be the transmission of augmented or virtual reality content to a device, such as a user device or a device in physical proximity of the user. At block 506, the digital objects and/or other data associated with the cell(s) and/or actions may be accessed from memory.

At block 508, the user or where a human user is engaging the system and where the digital objects may include augmented reality content, the augmented reality content may be transmitted to and presented by a user device (e.g., a user phone, where a live image of a physical environment captured by the phone camera is overlaid with the virtual reality content).

At block 510, the process detects (e.g., using streaming, real time, interaction data) when the user or automated process is interacting with the digital object (e.g., touching the rendering of the digital object on the user device, looking at the digital object, looking away from the digital object, moving the digital object, leaving a message and/or currency in response to viewing the digital object, requesting data, etc.), and may cause a corresponding action to be performed (e.g., moving content, transmitting a message, transferring digital currency, etc.). The streamed data may optionally be stored in short term or long term memory for later access.

At block 512, a determination is made as to whether the user or automated process has completed interacting with the interactive environment (e.g., by the user leaving the physical area associated with the interactive environment, by turning of the user device, by providing a command via the user device or via a hand gesture indicating that the user does not want to continue interacting with the environment, by the automated process issuing a terminate message, etc.).

At block 514, if the interaction is complete, the interaction data is stored in memory (e.g., long term storage, posted to a blockchain, or otherwise stored for later access). Optionally, not all the interaction data is stored. For example, certain data (e.g., precise movement data) may not be needed for later use in certain use cases and so may be filtered out and not stored in long term storage, to thereby reduce memory and power utilization. If the interaction is complete, the process may proceed to block 408 in FIG. 4.

Certain user interfaces will now be described.

Various toolsets may be provided that enables creation and management of the interactive environments described herein. Such toolset interfaces may enable the creation, sharing, discovery, and/or participation in such an interactive environment. For example, a browser may be provided that enables a user to browse a representation of interactive environments (e.g., ranked based on closeness to the user's current basis, the user's interests, the user's profile, etc.). The browser may present a listing of such interactive environments from which the user can select. The user may then interact with the selected environment. Optionally, in an example use case, the user may enter into the selected interactive environment physically or virtually via an avatar. The user may then participate in activities associated with the interactive environment (e.g., participate in games or other activities).

By way of further example, user interfaces may be provided that enable a user to manage the location of data and digital objects, associate and map addresses in a mesh, control privacy, activate and deactivate features, set preferences, monitor participants in the system, secure interactive environments, and/or the like.

The system may be configured to provide analytics and reporting via corresponding interfaces. For example, data identifying events and activities generated by or monitored by the system may be stored (e.g., in local memory, one cloud storage, on a blockchain, and/or otherwise). The system may generate corresponding reports or software dashboards on such information which may be rendered on a user device. In addition, the information may be used by other application.

With reference to the figures, certain example user interfaces will now be described that may be rendered on a user (e.g., administrator) device.

FIG. 11A illustrates an example channel definition user interface that may be used to define interactive environments (e.g., channels of streaming recorded or live content) that provide a collection immersive experiences for users. Different channels may be associated with different locations (e.g., different geo-fences, different meta-containers, different cells, etc.), different types of content (e.g., sports, entertainment, fashion, cars, travel, etc.), and with different content providers (e.g., channels associated with an advertiser, with a physical location, with different streaming service providers, etc.). The example channel definition user interface includes fields configured to receive from a user (e.g., an administrator/creator) a channel name, title, owner, and a channel description.

FIG. 11B illustrates an example administrator interface that enables a user (e.g., an administrator) to select a task category, such as devices (e.g., via which an RF tracking device may be paired with a user, enables an lets administrator to view user-device pairings, display devices available to the administrator in a selected environment, etc.), data cubes (via which a user can define data cubes, associate content with data cubes, view data cubes, assign data cubes names, etc.), environments, and users.

If the user selects environments, the example environment creation interface illustrated in FIG. 11C may be presented. An acquire environment control is provided via which when activated may activate an environment capture device (e.g., a camera, LIDAR, and/or other device) which may initiate day regarding the environment to captured so that a corresponding point cloud may be generated.

FIG. 11D illustrates an example designer user interface. A user may select content from a content bin (a gallery of content) and drag and drop the content to a corresponding location on a video playback area via which a video or still image of a physical environment (or a model thereof) may be played back or rendered to thereby associate the content with the physical area. The video or still image may be received from one or more devices that are physically present in the corresponding physical area. A file control may be provided via which the user may select and play back video or render a still image of a given physical location. Controls may be provided via which a user can pan and scroll through images of the environment in order to place content at a desired location. Optionally, distance information from a reference point (e.g., a wall in the physical environment) may be dynamically determined and displayed to correspond to movement of a cursor or pointing device over the video frame. A user may thus place content a specified dimensional distance from a reference point. Optionally, the user may draw a shape around an area of a video frame (e.g., a freeform shape, a circle, oval, square, rectangle, or other geometric shape) a drag and drop content to the shape to associate the content with the corresponding physical space. Optionally, a 2D or 3D mesh may overlay the image, wherein a user can draft content to a desired mesh cell. Optionally, controls are provided that enables content to be linked together.

FIG. 11E illustrates an example data cube (cell) creation user interface via which the user may assign a cell name, content, actions, schedules, triggers, trigger thresholds, commands, and/or programs.

FIG. 11F illustrates an example environment creation user interface optimized to be used via a mobile device (e.g., a smart phone). In this example, the user interface enables content to be associated with different data cubes/cells (A, B, C). For example, the user can assign (e.g., using a drag and drop operation) text, audio, video, image, lights, an IoT device, haptic (e.g., forces, vibrations, or motions), AR, and/or web links to a selected data cube. Optionally, some or all of the content types may be assigned by the user as augmented reality content.

A 2D-3D control may be used to indicate whether the content is to be associated with a two dimensional location/address (e.g., with an associated X, Y coordinate) or a three dimension location/address (e.g., with an associated X, Y, Z coordinate). For example, if there is only one tracking antenna in an environment, in certain situations it may only be able to resolve tracking to two dimensions, while if there are two tracking antennas in an environment, it may be possible to resolve tracking to three dimensions.

FIG. 11G illustrates the user interface of FIG. 11F with text assigned to data cube A, AR content assigned to data cube B, and lights assigned to data cube C.

FIG. 11H illustrates a user interface depicting a preview of text content assigned to a data cube. A menu of user-selectable colors is provided via which a text color may be assigned to the text (which may be rendered in real time using the selected color). A field is provided via which the user may edit the text content.

FIG. 11I illustrates a user interface depicting a preview of all three data cubes with the assigned content (text, AR, and light content). A deploy control is provided, which when activated causes the content to be deployed to the corresponding data cubes associated with respective physical locations so that users may access the content (e.g., in accordance with defined actions/rules).

It is understood that, although certain examples are described with respect to digital content, techniques described herein may be applied to other contexts, and not to purely digital content. For example, the mapping and manipulation of the containers, cells and mesh (e.g., grid) structures can be applied to chemical and particle level physical materials, and can include both regular and nanoscale physical spaces.

Thus, described herein are systems and methods that enable the connection of virtual environments with a three dimensional physical environment, wherein content, actions, commands, and/or rules may be associated with and manipulated in precise locations of physical space.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces Optionally, brain-computer or neural interfaces may be used to interact with and control the system and interactive environments.

Further, processing of the various components of the illustrated systems can be distributed across multiple machines, networks, and other computing resources, or may comprise a standalone system. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals (e.g., end user devices, administrator devices, etc.) described herein may be in the form of a mobile communication device (e.g., a cell phone), laptop, tablet computer, interactive television, game console, media streaming device, AR/VR head-wearable display, networked watch, etc. The user terminals may optionally include displays, speakers, haptic output devices (e.g., using an eccentric rotating mass (ERM) motor actuator, motorized force feedback device, weighted electromagnet device, focused ultrasound device, air vortex ring, and/or other such devices), user input devices (e.g., touchscreen, keyboard, mouse, microphones, voice recognition, etc.), network interfaces, etc. which enables corresponding location-based content and feedback (visual (e.g., 2D, AR, VR content), audio, and/or haptic content and feedback) to be provided to the user.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer system configured to provide augmented reality experiences, the computer system comprising:
    one or more processing devices;
    a network interface;

non-transitory memory that stores instructions that when executed by the one or more processing devices are configured to cause the computer system to perform operations comprising:

accessing a model of a first physical environment;

receiving a mesh definition of a three dimensional mesh using the network interface from a first terminal via a user interface, the three dimensional mesh comprising a plurality of mesh cells;

associating the mesh definition of the three dimensional mesh with the model of the first physical environment, wherein a given mesh cell corresponds to a specific location in the first physical environment;

enabling content and an action to be associated with a given mesh cell;

enabling a schedule to be associated with the action associated with the given mesh cell;

receiving, in real time, tracking data corresponding to movement of a first user in the first physical environment;

comparing the tracking data of the first user with mesh cell locations;

based at least on the comparison of the tracking data of the first user with mesh cell locations, identifying one or more matching mesh cells;

using addresses associated with the one or more matching mesh cells, identifying associated content, actions, and/or rules;

using the identified associated content, actions, and/or rules associated with the one or more matching mesh cells, causing augmented reality content to be rendered by a device in proximity to the first user, the augmented reality content displayed in association with a view of a physical space; and enabling a plurality of cells to be associated with respective unmanned vehicles.

2. A computer system configured to provide augmented reality experiences, the computer system comprising:

one or more processing devices;

a network interface;

non-transitory memory that stores instructions that when executed by the one or more processing devices are configured to cause the computer system to perform operations comprising:

accessing a model of a first physical environment;

receiving a mesh definition of a three dimensional mesh using the network interface from a first terminal via a user interface, the three dimensional mesh comprising a plurality of mesh cells;

associating the mesh definition of the three dimensional mesh with the model of the first physical environment, wherein a given mesh cell corresponds to a specific location in the first physical environment;

enabling content and an action to be associated with a given mesh cell;

enabling a schedule to be associated with the action associated with the given mesh cell;

receiving, in real time, tracking data corresponding to movement of a first user in the first physical environment;

comparing the tracking data of the first user with mesh cell locations;

based at least on the comparison of the tracking data of the first user with mesh cell locations, identifying one or more matching mesh cells;

using addresses associated with the one or more matching mesh cells, identifying associated content, actions, and/or rules;

using the identified associated content, actions, and/or rules associated with the one or more matching mesh cells, causing augmented reality content to be rendered by a device in proximity to the first user, the augmented reality content displayed in association with a view of a physical space; and enabling cryptocurrency to be associated with at least one mesh cell.

3. The computer system as defined in claim 2, wherein a first address of a first mesh cell identifies a three dimensional coordinate of a vertex of the first mesh cell.

4. The computer system as defined in claim 2, the operations further comprising enabling a user profile to be used to customize at least one action.

5. The computer system as defined in claim 2, wherein a first address of a first mesh cell is associated with a GPS notation for latitude and longitude.

6. The computer system as defined in claim 2, wherein the addresses associated with the one or more matching mesh cells used in associated content, actions, and/or rules comprises logical addresses.

7. The computer system as defined in claim 2, the operations further comprising enabling at least one action to be taken based at least in part on a time of day.

8. The computer system as defined in claim 2, the operations further comprising:

detecting a user focus based on detected user eye and/or head positioning;

based at least in part on the detected user focus, causing at least one item of content to be hidden from the user or displayed to the user.

9. The computer system as defined in claim 2, the operations further comprising:

enabling the first user to associate a message with a first mesh cell in the plurality of mesh cells;

detecting a second user presence in proximity to the first mesh cell; and at least partly in response to detecting the second user presence in proximity to the first mesh cell, enabling the message to be transmitted to a device associated with the second user.

10. The computer system as defined in claim 2, the operations further comprising enabling a privacy rule to be associated with at least one mesh cell.

11. The computer system as defined in claim 2, wherein augmented reality content associated with one or more mesh cells comprises interactive game content.

12. The computer system as defined in claim 2, the operations further comprising:

accessing a user profile for the first user, the profile indicating content preferences of the first user;

accessing a current location of the first user;

using the user profile for the first user and current location of the first user, selecting one or more interactive virtual environments; and causing a map to be rendered on a user device, the map indicating physical locations via which the selected one or more interactive virtual environments may be interacted with.

13. The computer system as defined in claim 2, the operations further comprising:

enabling a user to move digital content associated with a first location in the first physical environment to a second location in the first physical environment using a first gesture while in the physical environment.

14. The computer system as defined in claim 2, wherein the device in proximity to the first user comprises a device having a plurality of displays.

15. The computer system as defined in claim 2, wherein the identified associated content is associated with a physical location via a user interface comprising a content gallery and an interface configured to display a representation of the first physical environment, wherein the user interface enables a content item to be dragged from the content gallery to the interface configured to display a representation of the first physical environment to thereby associate the dragged content with the physical location.

16. The computer system as defined in claim 2, wherein the identified associated content is defined via a user interface comprising:
   a menu of a plurality of content types including:
      text,
      audio,
      video,
      still image,
      lights, and
      haptic content, and
   a channel interface enabling a selection of a channel from a plurality of channels, and via which a selected content type may be associated with a selected channel, wherein the selected channel comprises a content set.

17. The computer system as defined in claim 2, further comprising a plurality of tracking antennas in the first physical environment, the tracking antennas used to track movement and/or position of entities in the first physical environment.

18. A computer implemented method, the method comprising:
   accessing, using a computer system comprising one or more computing devices, a representation of a first physical environment;
   receiving a mesh definition of a mesh, the mesh comprising a plurality of mesh cells, wherein a given mesh cell is associated with an address;
   associating the mesh definition of the mesh with the first physical environment, wherein a given mesh cell corresponds to a specific location in the first physical environment;
   enabling a schedule to be associated with an action associated with the given mesh cell;
   enabling a user interface to be rendered via a terminal, the user interface enabling a user to associate an item of content to a location in the first physical environment corresponding to at least one mesh cell;
   receiving, via the user interface, an association of an item of content with a first location in the first physical environment,
   wherein the first location is associated with coordinates and the item of content comprises visual, audio, textual, and/or computer executable code;
   receiving using the computer system, in real time, tracking data corresponding to movement of a first entity in the first physical environment;
   based at least in part on the tracking data, determining using the computer system that the first entity is viewing or in proximity with the first location in the first physical environment;
   at least partly in response to determining that the first entity is viewing or in proximity with the first location in the first physical environment, enabling the content associated with the first location to be rendered by a device or to be executed;
   wherein the first entity comprises a robotic device.

19. A computer implemented method, the method comprising:
   accessing, using a computer system comprising one or more computing devices, a representation of a first physical environment;
   receiving a mesh definition of a mesh, the mesh comprising a plurality of mesh cells, wherein a given mesh cell is associated with an address;
   associating the mesh definition of the mesh with the first physical environment, wherein a given mesh cell corresponds to a specific location in the first physical environment;
   enabling a schedule to be associated with an action associated with the given mesh cell;
   enabling a user interface to be rendered via a terminal, the user interface enabling a user to associate an item of content to a location in the first physical environment corresponding to at least one mesh cell;
   receiving, via the user interface, an association of an item of content with a first location in the first physical environment,
   wherein the first location is associated with coordinates and the item of content comprises visual, audio, textual, and/or computer executable code;
   receiving using the computer system, in real time, tracking data corresponding to movement of a first entity in the first physical environment;
   based at least in part on the tracking data, determining using the computer system that the first entity is viewing or in proximity with the first location in the first physical environment;
   at least partly in response to determining that the first entity is viewing or in proximity with the first location in the first physical environment, enabling the content associated with the first location to be rendered by a device or to be executed; and
   enabling cryptocurrency to be associated with at least one mesh cell.

20. The method as defined in claim 19, the method further comprising:
   enabling an action to be associated with a given mesh cell.

21. The method as defined in claim 19, wherein a first address of a first mesh cell is associated with a GPS notation for latitude and longitude.

22. The method as defined in claim 19, wherein a first address of a first mesh cell comprises a logical address.

23. The method as defined in claim 19, the method further comprising enabling a user profile to be used to customize at least one action.

24. The method as defined in claim 19, the method further comprising enabling at least one action to be taken based at least in part on a time of day.

25. The method as defined in claim 19, the method further comprising enabling a plurality of cells to be associated with respective unmanned vehicles.

26. The method as defined in claim 19, the method further comprising:
   detecting a user focus based on detected user eye and/or head positioning;
   based at least in part on the detected user focus, causing at least one item of content to be hidden from the user or displayed to the user.

27. The method as defined in claim 19, the method further comprising:
- enabling an entity to associate a message with a second location with corresponding coordinates;
- detecting a second entity presence in proximity to the corresponding coordinates; and
- at least partly in response to detecting the second entity presence in proximity to the corresponding coordinates, enabling the message to be rendered to the second entity.

28. The method as defined in claim 19, the method further comprising:
- accessing a user profile for the first entity, the profile indicating content preferences of the first entity;
- accessing a current location of the first entity;
- using the user profile for the first entity and current location of the first entity, selecting one or more interactive virtual environments; and
- causing a map to be rendered on a device, the map indicating physical locations via which the selected one or more interactive virtual environments may be interacted with.

29. The method as defined in claim 19, the method further comprising:
- enabling a user to move digital content associated with a location in the first physical environment to a different location in the first physical environment using a first gesture while in the first physical environment.

30. The method as defined in claim 19, the method further comprising:
- providing access to a user interface comprising:
  - a content gallery, and
  - an interface configured to display a representation of the first physical environment,
  - wherein the user interface comprising the content gallery and the interface configured to display a representation of the first physical environment enables a content item to be dragged from the content gallery to the interface configured to display a representation of a physical environment to thereby associate the dragged content with a corresponding physical location in the physical environment.

31. The method as defined in claim 19, the method further comprising:
- providing access to a user interface comprising:
  - a menu of a plurality of content types including:
    - text,
    - audio,
    - video,
    - still image, and
    - haptic content, and
  - a channel interface enabling a selection of a channel from a plurality of channels, and via which a selected content type may be associated with a selected channel, wherein the selected channel comprises a content set.

32. The method as defined in claim 19, wherein the first entity comprises a person.

* * * * *